United States Patent
Higo et al.

(10) Patent No.: US 11,373,326 B2
(45) Date of Patent: Jun. 28, 2022

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventors: Tomoaki Higo, Kawasaki (JP); Kazuhiko Kobayashi, Yokohama (JP); Tomokazu Tsuchimoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 16/795,304

(22) Filed: Feb. 19, 2020

(65) Prior Publication Data
US 2020/0279388 A1 Sep. 3, 2020

(30) Foreign Application Priority Data
Feb. 28, 2019 (JP) .................. 2019-036704

(51) Int. Cl.
*G06T 7/593* (2017.01)
*G06T 5/40* (2006.01)
(Continued)

(52) U.S. Cl.
CPC ............... *G06T 7/593* (2017.01); *G06T 5/40* (2013.01); *H04N 13/128* (2018.05);
(Continued)

(58) Field of Classification Search
CPC . G06T 7/593; G06T 5/40; G06T 2207/10028; G06T 2207/10024; G06T 2207/20081; H04N 13/128; H04N 2013/0077; H04N 2013/0081; G01S 17/89; G01S 17/08; G01S 7/48
(Continued)

(56) References Cited

U.S. PATENT DOCUMENTS 8,761,492 B2 * 6/2014 Hirai ............... G06T 5/002
382/154
10,547,824 B2 * 1/2020 Tanaka ............... G06T 7/593
(Continued)

FOREIGN PATENT DOCUMENTS

JP 2008-65634 A 3/2008
KR 1020140064090 * 5/2014 ............. H04N 13/00

*Primary Examiner* — Jerome Grant, II
(74) *Attorney, Agent, or Firm* — Canon U.S.A., Inc. IP Division

(57) ABSTRACT

An information processing apparatus is configured to output a histogram for inspecting a state of a target object based on presence of a peak in a specific class in the histogram, the histogram representing a distribution of depth values from a measurement apparatus to the target object, the information processing apparatus including an acquisition unit configured to acquire depth information obtained from a result of measurement of a depth value from the measurement apparatus to the target object by the measurement apparatus and an output unit configured to output a histogram based on the acquired depth information so that a frequency of a class including a predetermined depth value to be applied when the depth value is not obtained is reduced.

19 Claims, 22 Drawing Sheets

(51) Int. Cl.
*H04N 13/128* (2018.01)
*H04N 13/00* (2018.01)

(52) U.S. Cl.
CPC .............. *G06T 2207/10024* (2013.01); *G06T 2207/10028* (2013.01); *G06T 2207/20081* (2013.01); *H04N 2013/0077* (2013.01); *H04N 2013/0081* (2013.01)

(58) Field of Classification Search
USPC ........................................................ 382/154
See application file for complete search history.

(56) References Cited

U.S. PATENT DOCUMENTS

| | | | |
|---|---|---|---|
| 2015/0015569 A1* | 1/2015 | Jung .................... | G06T 15/005 345/419 |
| 2015/0055828 A1* | 2/2015 | Zhao ........................ | G06T 7/20 382/103 |
| 2015/0116312 A1* | 4/2015 | Baik .................... | H04N 13/128 345/419 |
| 2016/0371845 A1* | 12/2016 | Yasovsky ........... | G02B 27/4205 |
| 2017/0188004 A1* | 6/2017 | Wang .................. | H04N 13/122 |
| 2017/0201735 A1* | 7/2017 | Tyshchenko ............ | G06T 13/00 |
| 2018/0204240 A1* | 7/2018 | Quentin ................. | G06Q 20/18 |
| 2020/0033615 A1* | 1/2020 | Kim ......................... | G06T 7/50 |
| 2020/0279388 A1* | 9/2020 | Higo .................... | H04N 13/128 |
| 2020/0290503 A1* | 9/2020 | Kawata ................... | G06T 7/521 |
| 2021/0208262 A1* | 7/2021 | Silver .................... | G01S 17/86 |

* cited by examiner

FIG.12
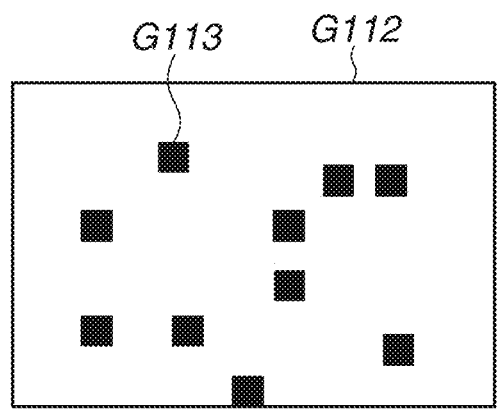
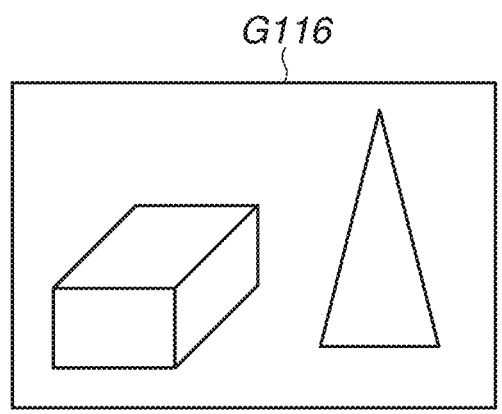
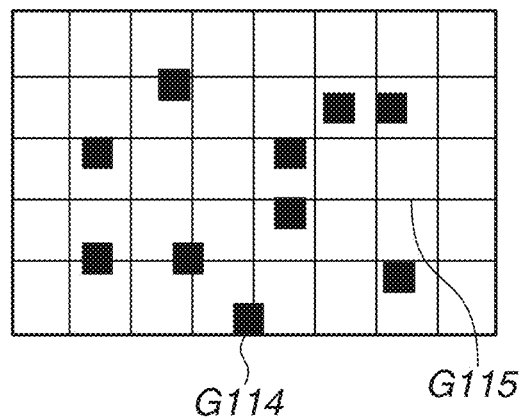
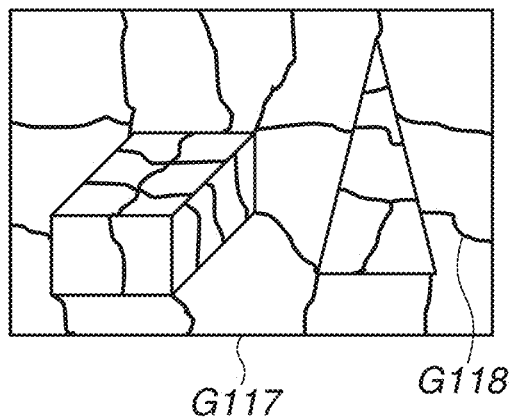

FIG.17
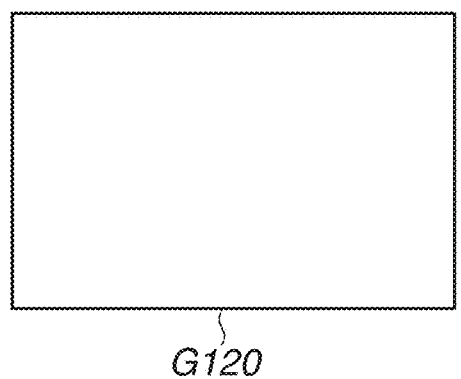
G120
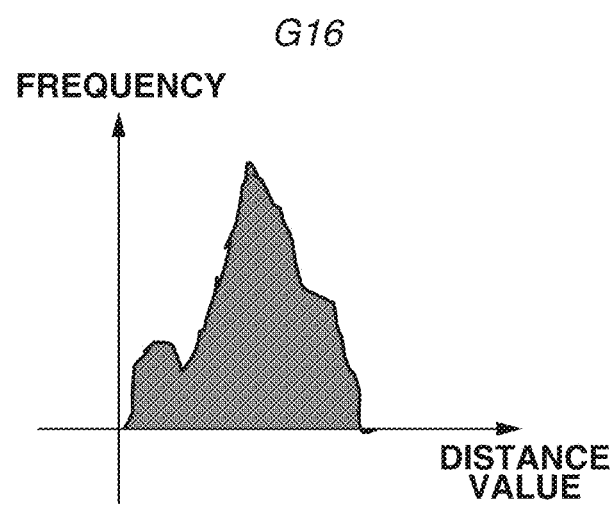
G16
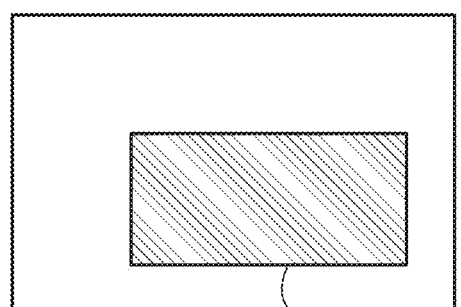
G121 G122
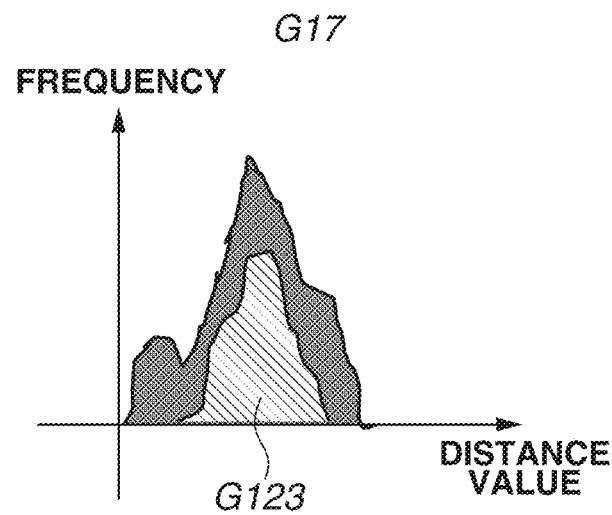
G17
G123

FIG.22
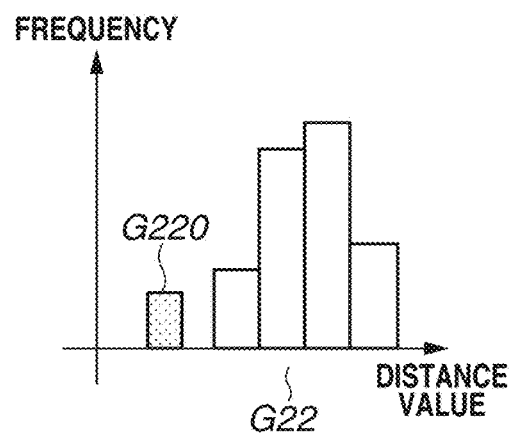
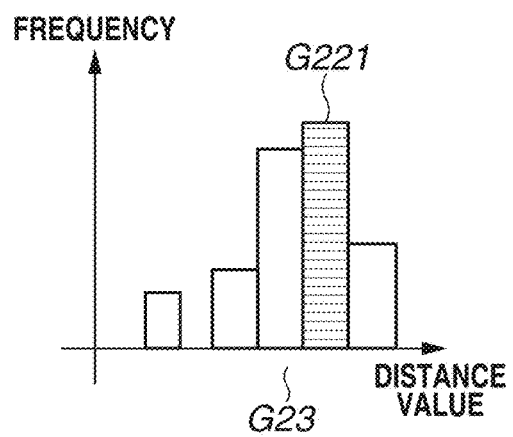
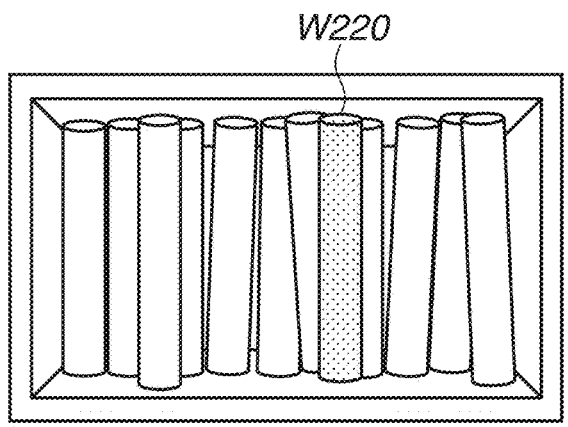
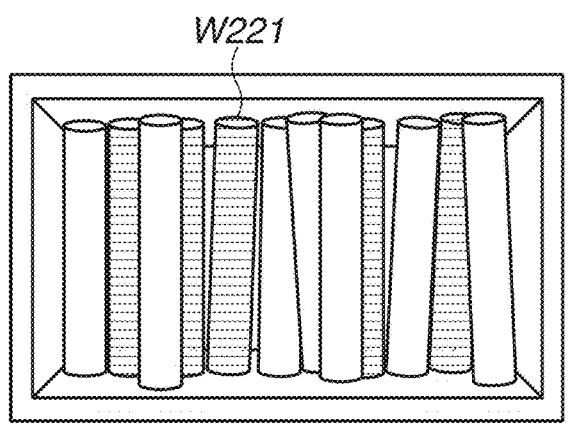

INFORMATION PROCESSING APPARATUS, INFORMATION PROCESSING METHOD AND STORAGE MEDIUM

BACKGROUND

Field

The present disclosure relates to a technique for presenting a depth image to a user.

Description of the Related Art

A depth image is an image including depth values corresponding to respective pixels in a captured scene, and used in various fields such as measurement of a shape in the scene and detection of an object. Among known methods for finding out a distribution of depth values in a depth image is a method for expressing the depth values of the pixels in a histogram. Japanese Patent Application Laid-Open No. 2008-65634 discusses a technique for extracting effective depth data of high reliability and ineffective depth data of low reliability by filtering depth data based on reliability. Japanese Patent Application Laid-Open No. 008-65634 further discusses a technique for generating a histogram based on the effective depth data.

SUMMARY

In some cases, the technique discussed in Japanese Patent Application Laid-Open No. 2008-65634 yields inaccurate depth data despite the high reliability. In such a case, the histogram generated based on the effective depth data can be hard for the user to see.

The present disclosure features presenting a histogram easily readable to the user.

According to an aspect of the present disclosure, an information processing apparatus configured to output a histogram for inspecting a state of a target object based on presence of a peak in a specific class in the histogram, the histogram representing a distribution of depth values from a measurement apparatus to the target object, includes an acquisition unit configured to acquire depth information obtained from a result of measurement of a depth value from the measurement apparatus to the target object by the measurement apparatus, and an output unit configured to output a histogram based on the acquired depth information so that a frequency of a class corresponding to a depth value to be applied when the depth value is not obtained is reduced.

Further features of the present disclosure will become apparent from the following description of exemplary embodiments with reference to the attached drawings.

BRIEF DESCRIPTION OF THE DRAWINGS

FIG. 12 is a diagram illustrating examples of area division.

FIG. 17 is a diagram illustrating examples of histograms.

FIG. 22 is a diagram illustrating examples of color images and corresponding histograms.

DESCRIPTION OF THE EMBODIMENTS

Figure 1:
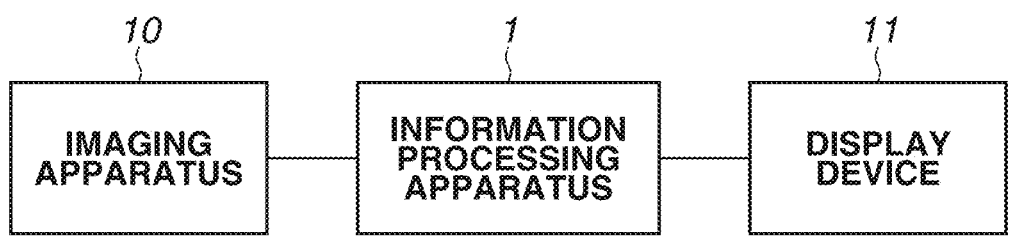
FIG. 1 is a diagram illustrating a hardware configuration example of an information processing system.

Before describing exemplary embodiments according to the present disclosure, the definitions of terms will be described.

A depth image refers to a two-dimensional image expressing each pixel in a scene captured by using a range sensor in the form of a depth value. The depth value is obtained as a depth from the center of the optical system of the range sensor to a target object included in the scene. In other words, depth data from the measurement apparatus (range sensor) to the target object is stored in each pixel of the depth image. Methods for determining a depth value will be described. In the case of a time-of-flight sensor, the time for emitted light to be reflected on an object in the scene and return to a light-receiving element is measured. Each pixel of the depth image stores the resulting, converted depth value. In the case of a stereoscopic camera, depth is determined by determining a correspondence between pixels in left and right, two juxtaposed intensity images. Determining correct depth values thus involves not only the determination of the amounts of light incident on the light-receiving elements but the subsequent processing as well. This typically means higher noise than in the intensity images. In addition, the measurement of a pixel value can fail in some pixels. A depth value indicating that a correct pixel value is unable to be measured is stored in the pixels where the pixel values are not successfully measured. For example, a value of 0, infinity, or a negative value is stored.

A histogram is a type of statistical graph with frequencies on the vertical axis and classes on the horizontal axis, a graph used to visually identify a distribution of data. A first exemplary embodiment deals with a histogram expressing a distribution of depth values in a depth image. For that purpose, continuous depth ranges are used as the classes on the horizontal axis. For example, in the case of a depth image including integer depth values of 0 to 100, the depth values are classified into ten classes of 0 to 9, 10 to 19, 20 to 29, 30 to 39, 40 to 49, 50 to 59, 60 to 69, 70 to 79, 80 to 89, and 90 to 100. The classes are referred to as bins. The number of classes is defined as the number of bins. In this example, the number of bins is 10. The number of pixels having depth values within the range of each bin in the depth image is expressed as a frequency on the vertical axis.

There are various use cases for an analysis using a depth image. If the overall tendency is difficult to comprehend by simply referring to the depth values themselves or observing the depth image, a histogram is generated to find out the tendency of the distribution of the depth values. Specifically, a depth image obtained from the result of the measurement of the depth values from the measurement apparatus to a target object by the measurement apparatus is acquired. A histogram representing the distribution of depth values included in a predetermined range, where the frequency of a class including a predetermined depth value is reduced, is output based on the depth image. A histogram may be output based on not only the depth image but a corrected image obtained by correcting the depth image. A more easily readable histogram can thus be output since information about pixels not measured by the measurement apparatus can be excluded from the histogram, or missing pixels can be complemented and reflected on the histogram.

The histogram represents the distribution of depth values from the measurement apparatus to a target object included in the scene, and is used for object detection, noise analysis, or shape analysis of the target object. The histogram is useful in getting a general idea of the actual measurement values from the depth image. However, if the depth image from which the histogram is generated includes much noise (measurement-failed pixels), information useful to the user (information of high reliability) is difficult to be presented. For example, in the case of a laser range sensor such as a light detection and ranging (LiDAR) sensor, the higher the reflectance of the laser light, the higher the reliability. If secondary reflection light having impinged on mirror surfaces twice is received, the light is not much attenuated and shows a high reflectance. However, depth values determined from secondary reflection light are not correct. In the case of a twin-lens stereoscopic camera, the higher the degree of similarity between local areas, the higher the reliability. If the target object is textured with a repetitive pattern, a plurality of areas having a high degree of similarity can be found. In such a case, the reliability of one area having a high degree of similarity can be calculated to be high while another area having a high degree of similarity is actually the right match. In such a situation, the reliability is high despite an incorrect depth value. Under the circumstances, the extraction of depth data depending on the magnitude of reliability is not necessarily desirable in generating a histogram including information useful to the user.

Figure 5A:
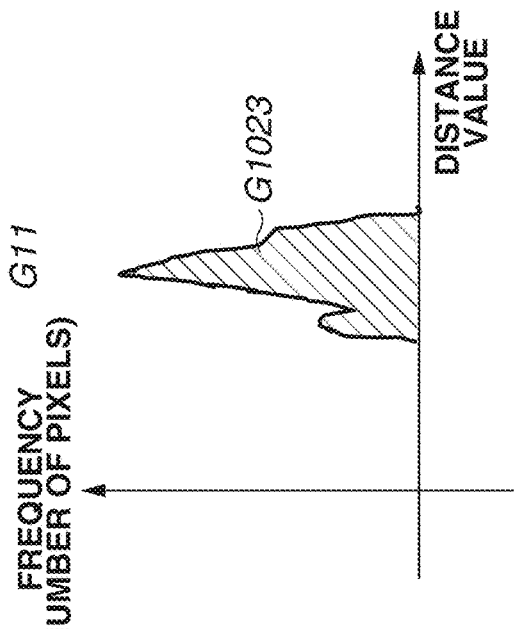
FIGS. 5A, 5B, 5C, and 5D are diagrams illustrating examples of histograms.

A specific example will be described with reference to FIGS. 5A to 5D. For example, suppose that a depth image and a histogram are used to situate an imaging apparatus right opposite to a target object. FIG. 5A illustrates a situation A1 where an imaging apparatus 5 is rightly opposed to an object 42. In a situation A2 of FIG. 5A, an object 43 is situated obliquely to the imaging apparatus 5. In analyzing the two situations with histograms, the histograms are generated from respective depth images captured. The depth images can include pixels where depth is not successfully measured (a depth value of 0 is stored). If such pixels are simply employed as histogram data, the depth value of 0 has a high frequency as in a histogram G10 illustrated in FIG. 5B, and peaks G101 of other depth values becomes less observable. This makes differences between the histograms generated from the depth images of the situations A1 and A2 difficult to see. In the present exemplary embodiment, information about the imaging apparatus and feedback information from the user are then used to reduce the data in such a bin G100. A histogram G11 generated from the depth image of the situation A1 includes sharp peaks G1023, in which case the imaging apparatus 5 and the target object is likely to be situated in parallel with each other. By contrast, a histogram G12 of FIG. 5D generated from the depth image of the situation A2 includes gentle peaks G102. In such a case, the imaging apparatus 5 and the target object are likely to be not parallel. Use of a histogram also makes the distribution of actual depth measurement values easily observable. Specifically, an information processing apparatus according to the first exemplary embodiment determines a display range of a histogram based on information about the range sensor (imaging apparatus), and further displays a histogram corrected based on input information in drawing the histogram. The input information refers to feedback information from the user and information derived from the imaging apparatus. An example of generating and drawing a histogram the user convenience of which is thus improved will be described. The method for generating and drawing the histogram can be changed based on user input by using various graphical user interfaces (GUIs).

FIG. 1 is a hardware configuration diagram of an information processing system according to the first exemplary embodiment. In FIG. 1, the information processing system includes an information processing apparatus 1, an imaging apparatus (measurement apparatus) 10 for capturing a depth image, and a display device 11 for displaying the captured depth image and a histogram. An example of the imaging apparatus 10 is a range sensor. An example of the display device 11 is a display. The information processing apparatus 1 processes the depth image captured by the imaging apparatus 10 to generate a histogram, and outputs the histogram to the display device 11. The information processing apparatus 1 accepts the user's input by using a GUI, generates and draws a histogram based on the user input, and displays the histogram on the display device 11.

Figure 2:
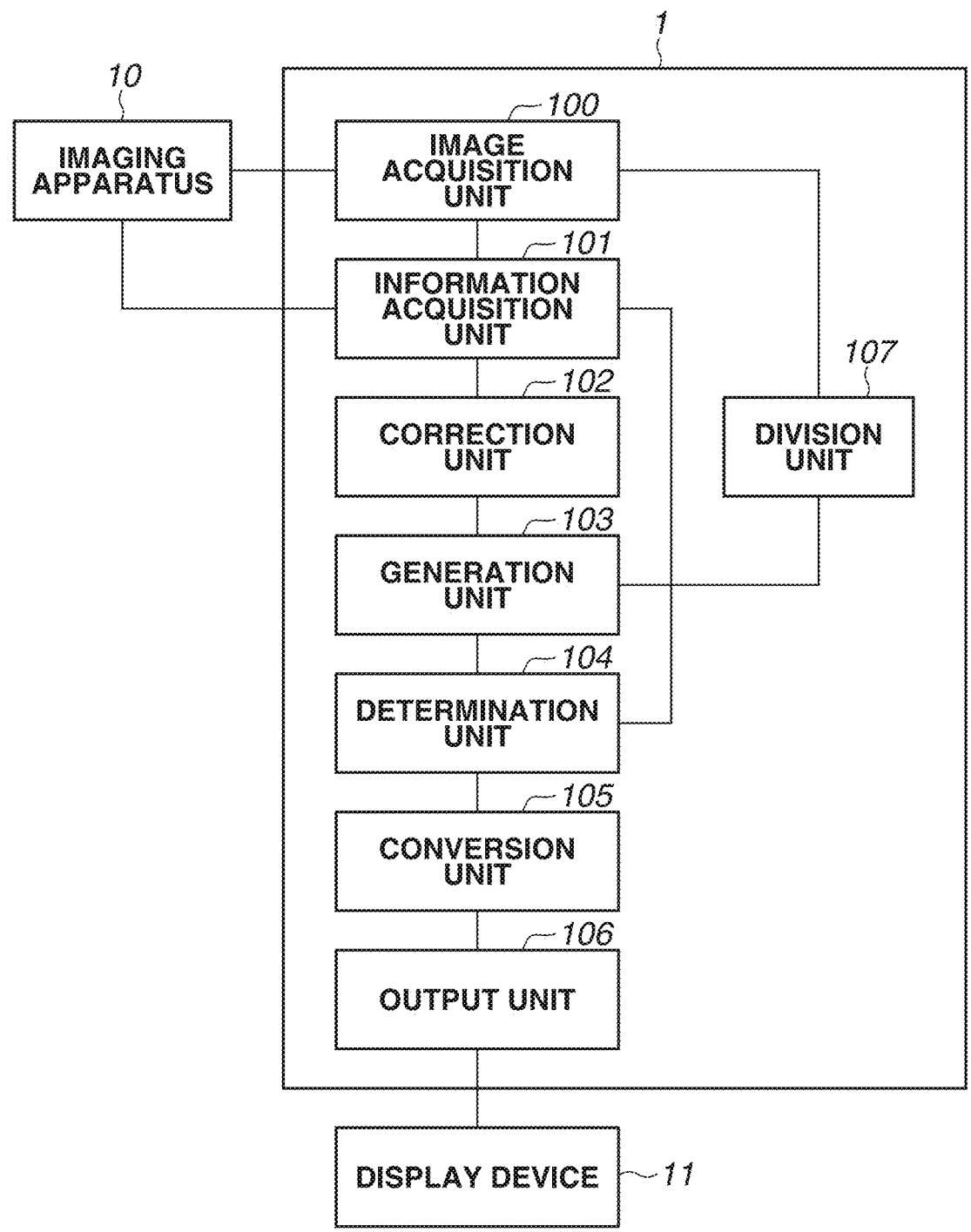
FIG. 2 is a diagram illustrating a functional configuration example of an information processing apparatus.

FIG. 2 is a diagram illustrating a functional configuration diagram of the information processing apparatus 1 according to the present exemplary embodiment. The information processing apparatus 1 includes an image acquisition unit 100, an information acquisition unit 101, a correction unit 102, a generation unit 103, a determination unit 104, a conversion unit 105, an output unit 106, and a division unit 107. The imaging apparatus 10 is connected to the image acquisition unit 100 and the information acquisition unit 101. The output unit 106 is connected to the display device 11. FIG. 2 illustrates only an example of the functional configuration and is not intended to limit the scope of application of the present disclosure.

The imaging apparatus (measurement apparatus) 10 captures a depth image that is a two-dimensional image storing depth values in respective pixels, and outputs the depth image to the image acquisition unit 100. Examples of the imaging apparatus 10 include a stereoscopic camera, a range sensor, and a red-green-blue-depth (RGB-D) camera.

The image acquisition unit 100 (first acquisition unit) acquires a depth image obtained from the result of the measurement of depth values from the measurement apparatus to a target object by the measurement apparatus. The image acquisition unit 100 here acquires a depth image indicating depth data from the imaging apparatus 10 to the target object, and outputs the depth image to the information acquisition unit 101.

The information acquisition unit 101 (second acquisition unit) acquires input information indicating depth values that the measurement apparatus is unable to correctly measure as ineffective depth values. In the present exemplary embodiment, examples of the input information include the following: information about the range of depth depths that the imaging apparatus 10 can measure; the value of a depth value to be stored in pixels that the imaging apparatus 10 fails to measure (for example, a depth value of 0); and a reliability map of depths (confidence of the depth values) at respective pixels during depth measurement. The input information acquired by the information acquisition unit 101 is output to the correction unit 102, the generation unit 103, and the determination unit 104. The reliability map refers to an image where the magnitude of reliability of depth in determining a depth value of the depth image is stored in each pixel. For example, the reliability is stored as a value of 0 to 1.0. The higher the reliability, the more likely the depth value is to be accurate. The reliability map has the same resolution as that of the depth image. A depth value or its reliability in the same area of a scene are stored at the same pixel positions.

The correction unit 102 corrects pixels where the measurement results of the measurement apparatus are outside a predetermined range of depth values. An example of the predetermined range is where depth values can be measured by the measurement apparatus. The correction unit 102 receives the depth image from the image acquisition unit 100 and the input information from the information acquisition unit 101, and corrects the depth image. The depth image given the correction processing will be referred to as a corrected image. The correction unit 102 outputs the corrected image to the generation unit 103. The correction of the depth image enables generation of a more precise histogram. Details of the correction processing will be described below.

The generation unit 103 generate a histogram where the frequency of a class including a predetermined depth value is reduced, based on the depth image or the corrected image. For example, the generation unit 103 generates a histogram so that the class including the value (here, a depth value of 0) stored in pixels where depth values are not measured (called missing pixels) is not emphasized. Here, the generation unit 103 receives, from the information acquisition unit 101, the information about the range of depth depths that the imaging apparatus 10 can measure and the depth value to be stored in pixels that the imaging apparatus 10 fails to measure, and generates the histogram based on the information and the depth value. The generation unit 103 outputs the generated histogram to the determination unit 104.

The determination unit 104 receives the histogram from the generation unit 103 and the reliability map from the information acquisition unit 101, and determines reliability-based color data on the histogram data. The determination unit 104 outputs data on the resulting colored histogram to the conversion unit 105. A histogram easily readable to the user can be output by changing the display color of the histogram.

The conversion unit 105 receives the data on the colored histogram from the determination unit 104, and converts the colored histogram into image data (histogram image data) to be displayed on the display device 11. The conversion unit 105 outputs the generated histogram image data to the output unit 106. The output unit 106 receives the histogram image data from the conversion unit 105, and outputs the histogram image data to the display device 11. The output unit 106 may also output the depth image and a GUI as appropriate. The division unit 107 divides the depth image or a corresponding color image based on a predetermined rule. For example, the division unit 107 divides the depth image by a grid of predetermined size (for example, into 10-pixel-by-10-pixel square cells). Alternatively, the division unit 107 divides the depth image into areas so that similar image features are included in the same areas based on image features obtained from the color image.

The display device 11 is a display, and draws and displays the histogram image data output from the output unit 106 in a predetermined area. The display device 11 also displays the depth image and the GUI.

Figure 3:
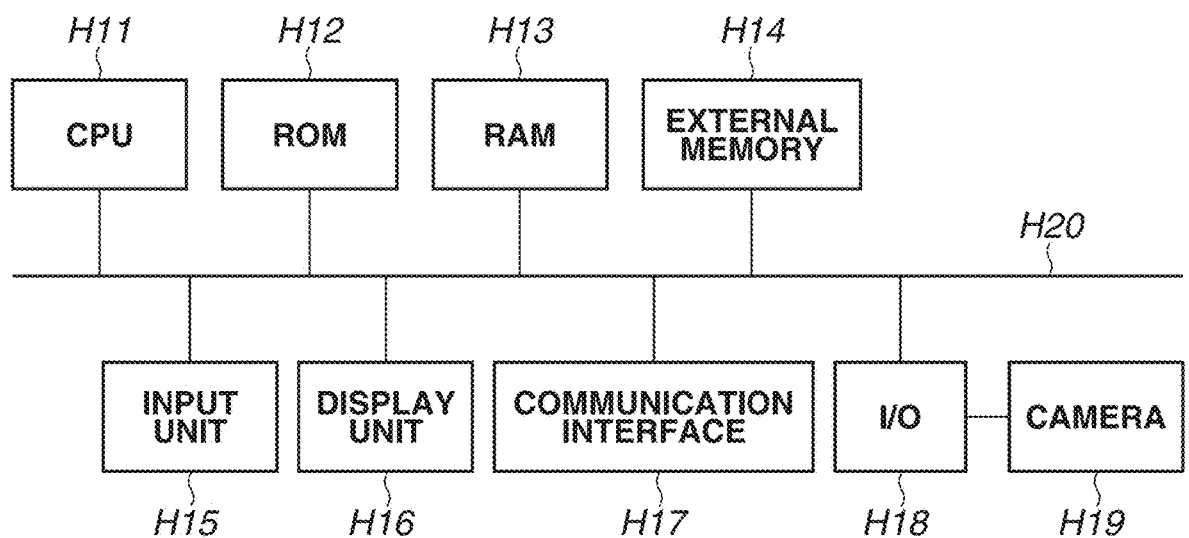
FIG. 3 is a diagram illustrating a hardware configuration example of the information processing apparatus.

FIG. 3 is a diagram illustrating a hardware configuration of the information processing apparatus 1. A central processing unit (CPU) H11 controls various devices connected to a system bus H20. A read-only memory (ROM) H12 stores a basic input/output system (BIOS) program and a boot program. A random access memory (RAM) H13 is used as a main storage device of the CPU H11. An external memory H14 stores a program for the information processing apparatus 1 to process. An input unit H15 performs processing related to information input. Examples of the input unit H15 include a touch panel, a keyboard, a mouse, and a robot controller. A display unit H16 outputs a calculation result of the information processing apparatus 1 to the display device 11 based on instructions from the CPU H11. The display device 11 may be of any type. Examples include a liquid crystal display, a projector, and a light-emitting diode (LED) indicator. A communication interface H17 performs information communication via a network. The communication interface H17 may be an Ethernet (registered trademark) communication interface, and may perform any type of information communication, including Universal Serial Bus (USB) communication, serial communication, and wireless communication. An input/output unit (I/O) H18 is connected to a camera H19. The camera H19 corresponds to the imaging apparatus 10. The display unit H16 corresponds to the display device 11.

Figure 4:
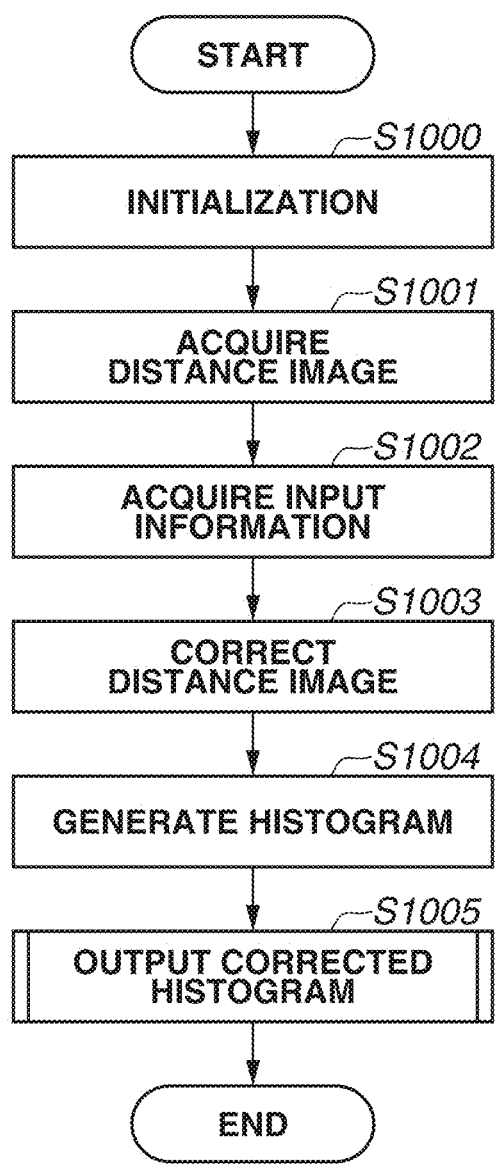
FIG. 4 is a flowchart illustrating a processing procedure to be performed t information processing apparatus.

Next, a processing procedure according to the present exemplary embodiment will be described. FIG. 4 is a flowchart illustrating a processing procedure to be performed by the information processing apparatus 1. The information processing apparatus 1 does not necessarily need to perform all the steps described in the flowchart. In the following description, the flowchart is implemented by the CPU H11 of FIG. 3, which is a computer, executing a computer program stored in the external memory H14.

In step S1000, the information processing apparatus 1 initializes the information processing system. Specifically, the CPU H11 reads the computer program from the external memory H14 and makes the information processing apparatus 1 operable.

In step S1001, the image acquisition unit 100 acquires a depth image obtained from the result of the measurement of depth valued from the measurement apparatus (imaging apparatus 10) to a target object by the measurement apparatus. However, this is not restrictive. For example, a depth image captured by the imaging apparatus 10 may be stored as a depth image file in advance, and the image acquisition unit 100 may acquire the depth image by reading the depth image file. If the information processing apparatus 1 includes a storage unit for storing a depth image, the image acquisition unit 100 may acquire the depth image from the storage unit. If there is a storage device for storing a depth image outside the information processing apparatus 1, the image acquisition unit 100 may acquire the depth image via a not-illustrated communication unit.

In step S1002, the information acquisition unit 101 acquires input information indicating the range of depth values that the measurement apparatus is unable to measure as ineffective depth values. In other words, the information acquisition unit 101 acquires input information for specifying the range of depth values to be displayed as a histogram. The information acquisition unit 101 may acquire the input information by using a trained model that outputs the input information for specifying the display range of the histogram with the depth image as an input. A histogram easily readable to the user can be easily presented by using a trained model trained with a display range that the user wants to observe. The input information is not limited to the foregoing. For example, the information acquisition unit 101 acquires information about the range of depth depths that the imaging apparatus 10 can measure, the depth value stored in pixels that the imaging apparatus 10 fails to measure, and a reliability map indicating the confidence of the depth values in the pixels during depth measurement. The reliability map refers to a two-dimensional image where reliability is stored in each pixel. Here, the information acquisition unit 101 acquires the input information from the imaging apparatus 10. Other information for setting the range of depth values to be assigned to each class of the histogram may be used as the input information. As a specific example, suppose that there are depth values of 0 to 1999 that are divided into 20 classes in steps of 100. The input information may set the range of depth values to include depth values of 100 to 1999, divided into 19 classes in units of 100. Depth values of 1 to 2000, excluding only 0, may be divided into 20 classes in units of 100. A histogram easily readable to the user can be generated by thus setting the range of depth values in each class.

In step S1003, the correction unit 102 corrects pixels the depth values of which measured by the measurement apparatus are outside a predetermined range among the pixels constituting the depth image. Specifically, the correction unit 102 corrects the pixels the depth values of which measured by the measurement apparatus are outside the predetermined range by using the depth values included in pixels near those pixels. The correction unit 102 performs predetermined processing on the depth image to obtain a corrected image in which areas where the depth values are unable to be correctly measured (noise) are reduced. Details of the predetermined processing will be described. A depth image is obtained by calculating depth values. This means higher noise than in a color image or intensity image, and there are pixels where depth is unable to be measured. Moreover, a value indicating a failure of depth measurement is stored in pixels having low reliability (reliability lower than a preset value). The pixels having low reliability are also regarded as noise. To reduce such noise, the correction unit 102 performs noise reduction during opening processing and closing processing. The correction unit 102 also performs smoothening by using a bilateral filter or guided filter. As employed herein, such noise-reduced depth image is referred to as a corrected image. The corrected image is a type of depth image the noise of which is reduced by the correction unit 102. Basically, if there is a pixel (depth value-missing pixel) where the depth value is significantly different from those of the surrounding pixels like an isolated point, the depth value is changed to a value similar to those of the surrounding pixels. For example, suppose that a center pixel of 3×3 pixels has a depth value of 4, and the surrounding pixels a depth value of 104. In such a case, the pixel having a depth value of 4 is regarded as noise since the pixel having a depth value of 4 is an isolated point with a significantly different depth value from those of the surrounding pixels. In the corrected image, a depth value close to 104 is then stored in the pixel which had a depth value of 4.

Figure 5B:
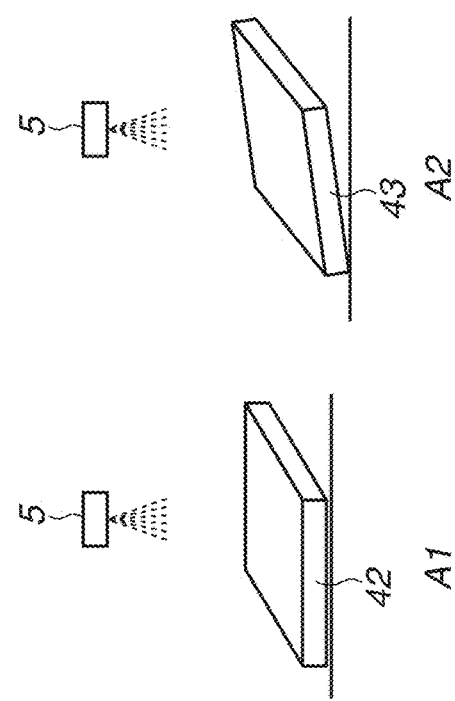
Figure 5C:
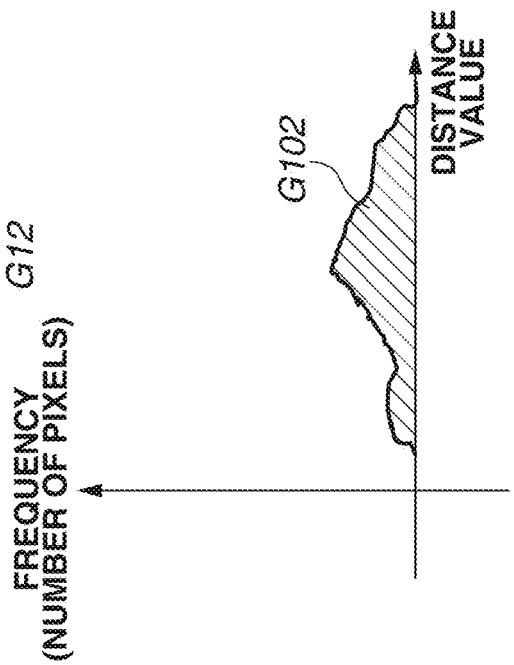
Figure 5D:
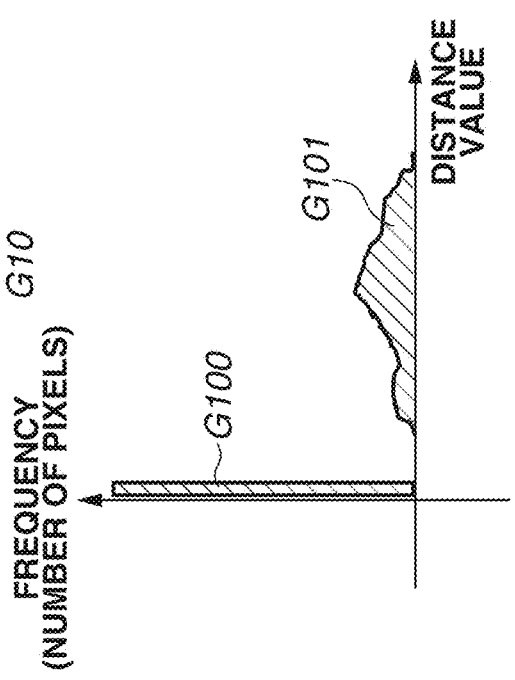

In step S1004, the generation unit 103 generates a histogram where the frequency of a class including a predetermined depth value is reduced, based on the depth image. The range of depths to generate the histogram is set to the range of depth depths that the imaging apparatus 10 can measure based on the input information acquired by the information acquisition unit 101. Specifically, if the range of measureable depth depths is 200 to 1000, the range of the horizontal axis of the histogram is set to 200 to 1000. A histogram where erroneous values due to measurement errors are excluded can be generated and drawn by thus generating the histogram using the range of measurable depth depths obtained from the imaging apparatus 10. If the range of measurable depth depths of the imaging apparatus 10 is unknown or not set, the generation unit 103 acquires information about the value stored in the pixels where depth measurement has failed, and generates a histogram within the range of maximum and minimum depth values excluding the value. FIGS. 5A to 5D are diagrams illustrating an example for describing a histogram generated by taking into account the value stored in the measurement-failed pixels. Suppose that the histograms of FIGS. 5B to 5D are generated from depth images having values of 0 to 1250, and the value stored in the measurement-failed pixels is 0. The histogram G10 of FIG. 5B is generated by using all the values of the depth image. The bin G100 represents a high frequency of the measurement-failed pixels. The peaks G101 represent the histogram area other than that of the measurement-failed pixels. Due to the limited area for drawing the histogram, the drawn histogram is normalized to the maximum frequency value. The frequencies of the peaks G101 are thus relatively lower than that of the bin G100, and the distribution of the depth values is difficult to observe. By contrast, FIG. 5C illustrates the histogram G11 that is generated within the range from a minimum value of 120 to a maximum value of 1250, excluding 0. By excluding the depth range corresponding to the bin G100 from the generation of the histogram, the peaks G101 can be drawn like the peaks G1023, and accordingly the distribution of the depth values is made easier to observe. The number of bins in the histogram can be set to the same value as or a value not greater than the number of pixels of the drawing area where the histogram is eventually drawn on the display device 11. However, this is not restrictive. The user may set any number of bins by using a not-illustrated GUI for setting the number of bins, and the histogram may be generated based on the number.

Figure 6:
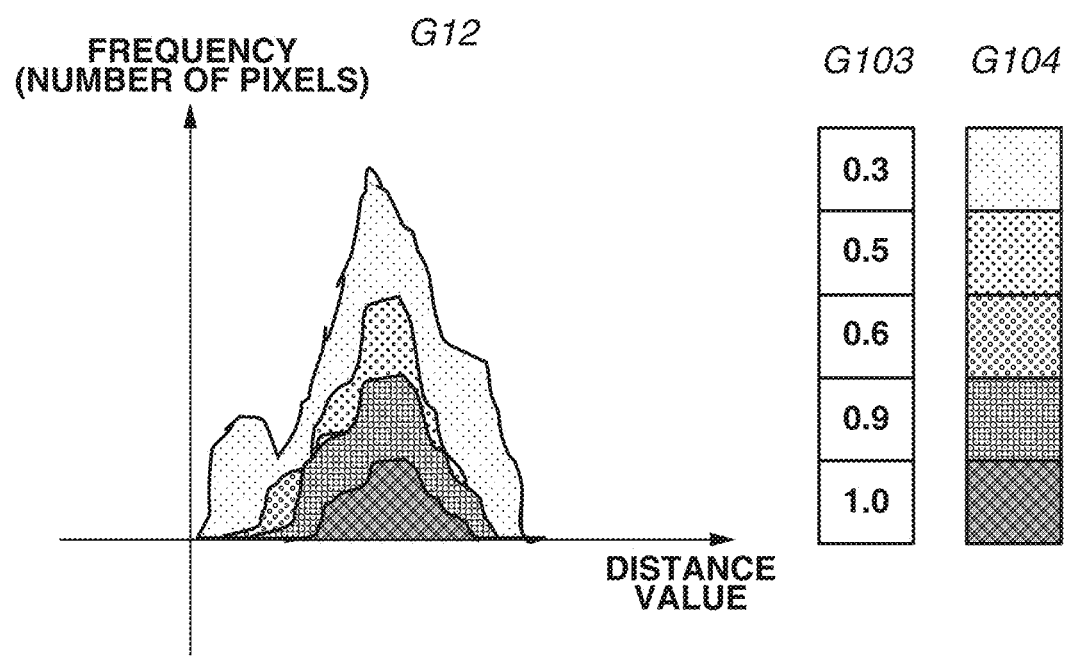
FIG. 6 is a diagram illustrating an example of a histogram.

In step S1005, the output unit 106 outputs a corrected histogram obtained by correcting the histogram generated in step S1004 based on at least either one of the input information and the corrected depth image. For example, if the input information is information about reliability-based display, the output unit 106 determines reliability-dependent color data on the histogram based on the histogram generated in step S1004 and the reliability map acquired in step S1002. Specifically, the output unit 106 determines color data where each bin includes not only the numerical value of the frequency but also color vector information including as many elements as the frequency value. FIG. 6 is a diagram for describing an example of a histogram colored by reliability. A method for determining color data on a histogram G127 based on reliability will be described with reference to FIG. 6. First, the output unit 106 acquires a group of pixel positions corresponding to each bin of the histogram. The output unit 106 then acquires the reliabilities of the group of pixel positions from the reliability map, and sorts the reliabilities in descending order. The output unit 106 then determines the color of the bin in the histogram based on the intensity corresponding to the sorted order. For example, suppose that a bin has a frequency of 5, and the corresponding reliabilities are (0.9, 0.3, 0.6, 1.0, 0.5). The output unit 106 sorts the reliabilities in descending order to obtain reliabilities G103 (1.0, 0.9, 0.6, 0.5, 0.3). The output unit 106 then converts the reliabilities G103 into intensity G104, and accordingly the color of the histogram in the bin is determined. The histogram G127 colored by reliability is obtained by performing such operations on all the bins. The histogram G12 colored by reliability enables the user to intuitively understand the distribution of depth values with the reliabilities taken into account. The user can thus efficiently perform analysis and value setting by using the histogram.

Figure 7:
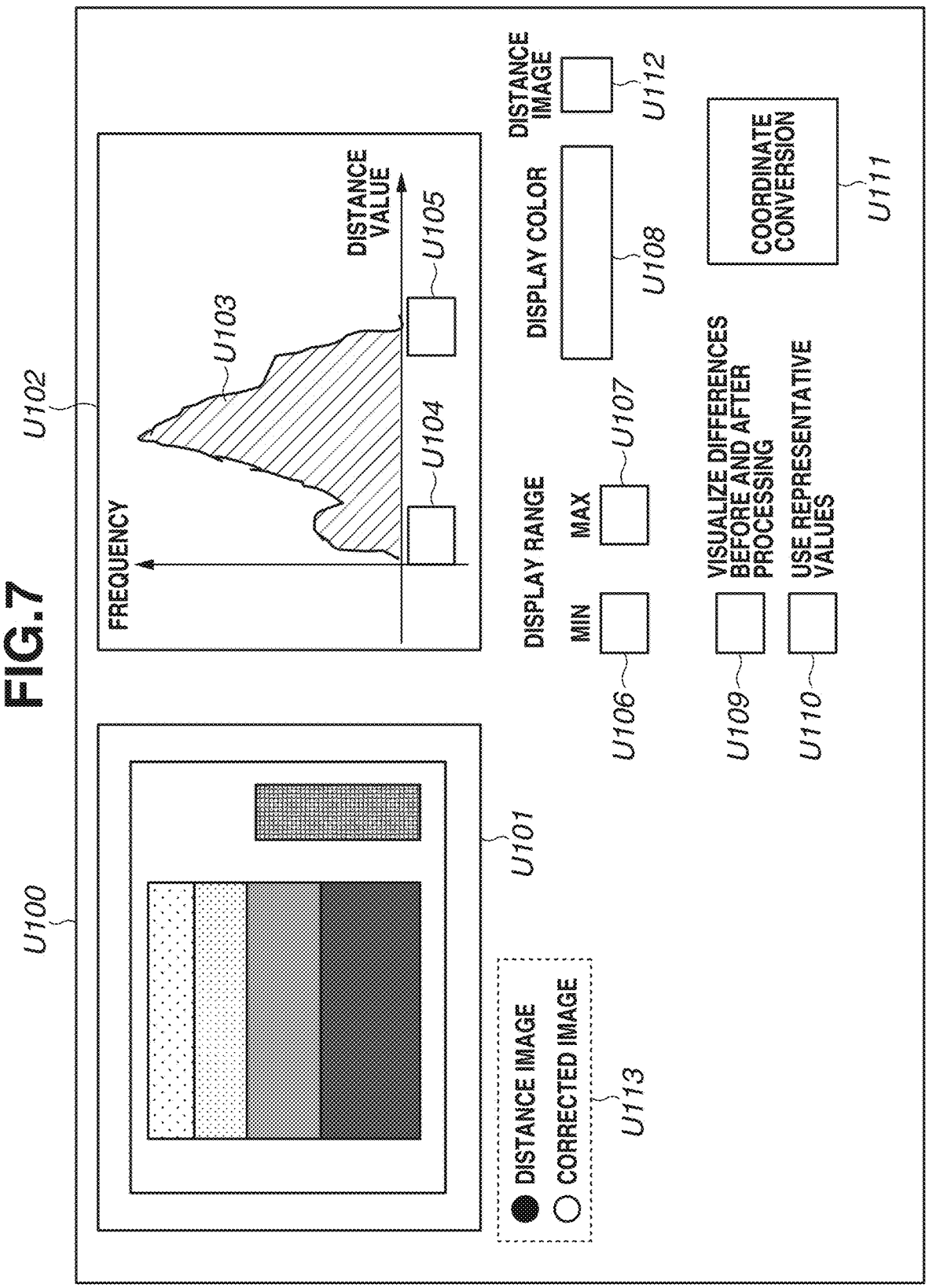
FIG. 7 is a diagram illustrating an example of a graphical user interface (GUI).

Next, a processing method by which the user makes various modifications to the histogram in an interactive manner after the display of the histogram will be described. FIG. 7 is a diagram illustrating an example of a GUI for displaying and editing a depth image and a histogram. FIG. 7 illustrates a GUI window U100 for displaying and editing a depth image and a histogram. An area U101. displays the depth image. An area U102 displays a histogram U103. An area U104 displays a minimum depth value displayed in the histogram U103. An area. U105 displays a maximum depth value displayed in the histogram U103. The minimum value of the display range of the histogram U103 can be edited in an area U106. The maximum value of the display range of the histogram U103 can be edited in an area U107. A drop-down list U108 is for selecting the display color of the histogram U103. A checkbox U109 is for selecting whether to visualize differences before and after processing. A checkbox U110 is for selecting whether to use representative values. A button U111 is for performing coordinate transformation. A checkbox U112 is for selecting whether to reflect the drawing color of the histogram on the depth image as well. Radio buttons U113 are for selecting whether to display the image to be displayed in the area U101 and the original image from which the histogram U103 is generated in the form of the depth image or the corrected image. The user can make various modifications to the histogram U103 by using such a GUI. The following description will be given on the assumption that the depth image is selected by the radio buttons U113.

Figure 8:
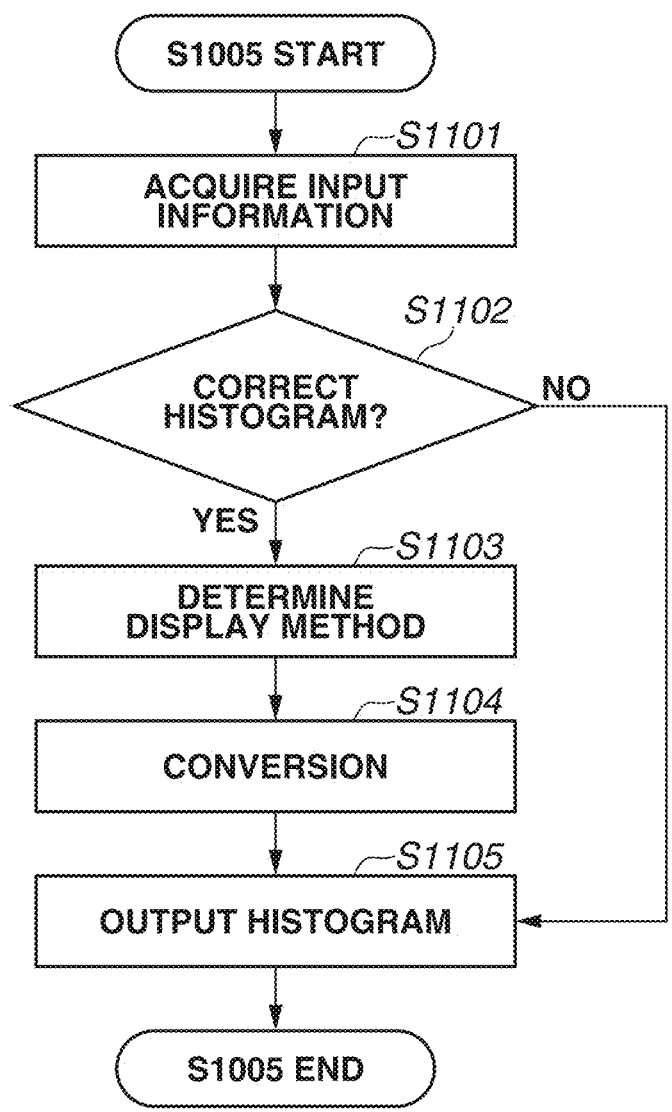
FIG. 8 is a flowchart illustrating a processing procedure to be performed by the information processing apparatus.

The information acquisition unit 101 acquires such input information from the user, and outputs the input information to a not-illustrated decision unit. The decision unit determines whether to generate the histogram again. The processing procedure of step S1005 including such operations will be described. FIG. 8 is a flowchart illustrating a processing procedure for modifying the histogram based on user input. With reference to the flowchart of FIG. 8, the processing procedure will be described for each of the following five cases: where the display color is changed, where the minimum and maximum values of the display range are changed, where differences before and after processing are visualized, where representative values are used, and where coordinate transformation is performed.

Where Display Color is Changed

In the present processing, the display color of the histogram and the color of the depth image are changed to the color specified by the user. The processing procedure thereof will be described.

Figure 9:
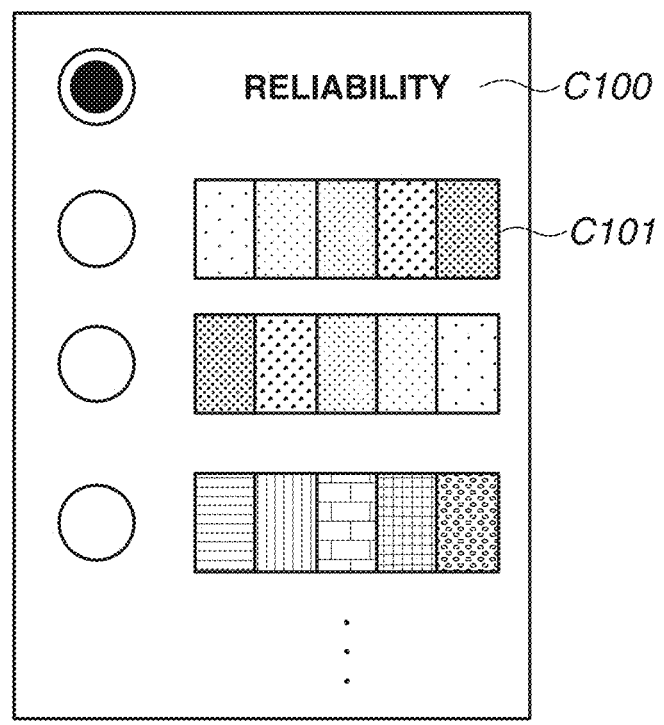
FIG. 9 is a diagram illustrating an example of a drop-down list.

In step S1101, the information acquisition unit 101 acquires input information indicating the information about the color of the histogram set in the drop-down list U108 and the check state of the checkbox U112. Specifically, the information acquisition unit 101 obtains the information to change the display color to the color of a color bar pattern C101 (see FIG. 9) and reflect the display color on the depth image as well. The user can click or touch on the drop-down list U108 on-screen and select the color to draw the histogram and the depth image in from the drop-down list U108 for selecting the display color. FIG. 9 is a diagram illustrating an example of the drop-down list U108 for selecting the display color. The user selects one from among the alternatives illustrated in FIG. 9, including a reliability gray scale C100 and a plurality of color bar patterns such as the color bar pattern C101. The user can also check the checkbox U112 indicating whether to reflect the display colors on the depth image as well. The present processing will be described for a case where the reliability gray scale C100 has been selected in an initial state and then the user selects the color bar pattern C101 and checks the checkbox U112 in step S1101.

In step S1102, the correction unit 102 determines whether to correct the generated histogram. If the display color is not changed (NO in step S1102), the processing proceeds to step S1105. If the display color is changed (YES in step S1102), the processing proceeds to step S1103.

In step S1103, the determination unit 104 determines a method for displaying the histogram based on the color specified by the user. The determination unit 104 determines the display color (display method) based on the information about the change in the display color (information about the set color of the histogram). The conversion unit 105 generates colored histogram data from the determined color data. The determination unit 104 applies the color bar pattern C101 to the depth image. The left colors in the color bar pattern C101 indicate smaller depths, and the right colors greater depths. The determination unit 104 thus associates the depth values with the colors in the color bar pattern C101 so that the minimum depth value of the histogram displayed in the area. U104 corresponds to the leftmost color in the color bar pattern C101, and the maximum depth value of the histogram displayed in the area U105 corresponds to the rightmost color in the color bar pattern C101. The determination unit 104 then determines the colors in the color bar pattern C101 corresponding to the depth values in the respective bins of the histogram as color information about the histogram. The determination unit 104 further determines information for applying the colors in the color bar pattern C101 corresponding to the depth values of the respective pixels to the depth image drawn in the area U101.

In step S1104, the conversion unit 105 generates image data on the colored histogram and color-converted image data on the depth image. Specifically, the conversion unit 105 converts the colored histogram data into image data as in step S1006. The conversion unit 105 also updates the image data for drawing the depth image with the colors in the color bar pattern C101 corresponding to the depth values of the respective pixels.

In step S1105, the output unit 106 outputs the histogram of the changed display method by using the color determined by the determination unit 104. The output unit 106 outputs the image data on the histogram and the image data on the depth image generated in step S1104 to the display device 11. The display device 11 displays the image data on the histogram in the area U102, and the image data on the depth image in the area U101.

By the foregoing processing, the information processing apparatus 1 generates a histogram easily readable to the user by changing the display color of the histogram and the color of the depth image based on the display color specified by the user. The user can analyze the histogram and the depth image in desired color.

Where Minimum and Maximum Values of Display Range are Changed

In the present processing, the display range of the histogram is changed to the range specified by the user, and the drawing color of the depth image is also changed accordingly. A processing procedure thereof will be described.

In step S1101, the information acquisition unit 101 acquires input information for changing the display range of the histogram to the range specified by the user. Specifically, the information acquisition unit 101 acquires input information indicating the information about the depth values from the areas U106 and U107 and the check state of the checkbox U112. In other words, the information acquisition unit 101 acquires information that the maximum and minimum values of the display range of the histogram are changed and are also reflected on the depth image. The user sets the display range of the histogram by inputting depth values into the areas U106 and U107. The display range may be set by inputting numerals from the keyboard, by displaying numerical keys on-screen and inputting numerals by mouse operations or by touch operations on a touch panel, or by inputting numbers using numerical value slide bars. A not-illustrated maximum value button or minimum value button may be pressed to automatically input the maximum or minimum value of the depth image. Whether to reflect the settings on the depth image as well is input to the checkbox U112. The present processing will be described for a case where the color bar pattern C101 is selected for the display color, the depth values in the areas U106 and U107 are changed, and the checkbox U112 is checked.

In step S1102, the correction unit 102 determines whether to correct the generated histogram. The correction unit 102 receives information about a change in the display range. If the display range is changed, the correction unit 102 determines to correct the histogram (YES in step S1102) and the processing proceeds to S1103. If the display range is not changed (NO in step S1102), the processing proceeds to step S1105.

In step S1103, the determination unit 104 determines the display range of the histogram. The determination unit 104 determines color data on the histogram like step S1104 in the case of changing the display color, and generates colored histogram data and data on the depth image. If the depth value in the area U106 is greater than the minimum depth value of the depth image, the determination unit 104 associates the pixels having depth values smaller than that in the area U106 with a different color not included in the color bar pattern C101. Similarly, if the depth value in the area U107 is smaller than the maximum depth value of the depth image, the determination unit 104 associates the pixels having depth values greater than that in the area U107 with a different color not included in the color bar pattern C101. Such coloring can visualize the areas of the depth image corresponding to outside the display range of the histogram.

In step S1104, the conversion unit 105 generates image data on the colored histogram and color-converted image data on the depth image. Specifically, the conversion unit 105 converts the colored histogram data into the image data like step S1006. The conversion unit 105 also updates the image data for drawing the depth image with the color of the color bar pattern C101 corresponding to the depth value of each pixel and with the color representing outside the display range set in step S1104.

In step S1105, the output unit 106 outputs the histogram within the display range specified by the input information. The output unit 106 outputs the image data on the histogram and the image data on the depth image generated in step S1104 to the display device 11. The display device 11 displays the image data on the histogram in the area U102, and the image data on the depth image in the area U101. The display device 11 also displays the value of the area U106 in the area U104, and the value of the area U107 in the area U105.

By the foregoing processing, the histogram is generated and the color of the histogram and the drawing color of the depth image are changed based on the display range of the histogram specified by the user. This enables the user to analyze depth values in the range of interest.

Where Differences Before and After Processing are Visualized

In the present processing, the checkbox U109 about whether to visualize differences before and after processing is checked to visualize differences between the depth image input to the correction unit 102 and the corrected image output from the correction unit 102. A processing procedure thereof will be described.

In step S1101, the information acquisition unit 101 acquires input information indicating the check state of the checkbox U109. In other words, the information acquisition unit 101 acquires information about whether to visualize differences before and after processing. The user checks the checkbox U109 about whether to visualize differences before and after processing. The present processing will be described for a case where the checkbox U109 is checked with the color bar pattern C101 selected for the display color.

In step S1102, the correction unit 102 determines whether to correct the generated histogram. The correction unit 102 receives the information about whether to visualize differences before and after processing. If the checkbox U109 is checked (YES in step S1104 the processing proceeds to step S1103 to change the display color of the histogram. If the checkbox U109 is not checked, i.e., if the visualization processing is not intended (NO in step S1104 the processing proceeds to step S1105.

Figure 10:
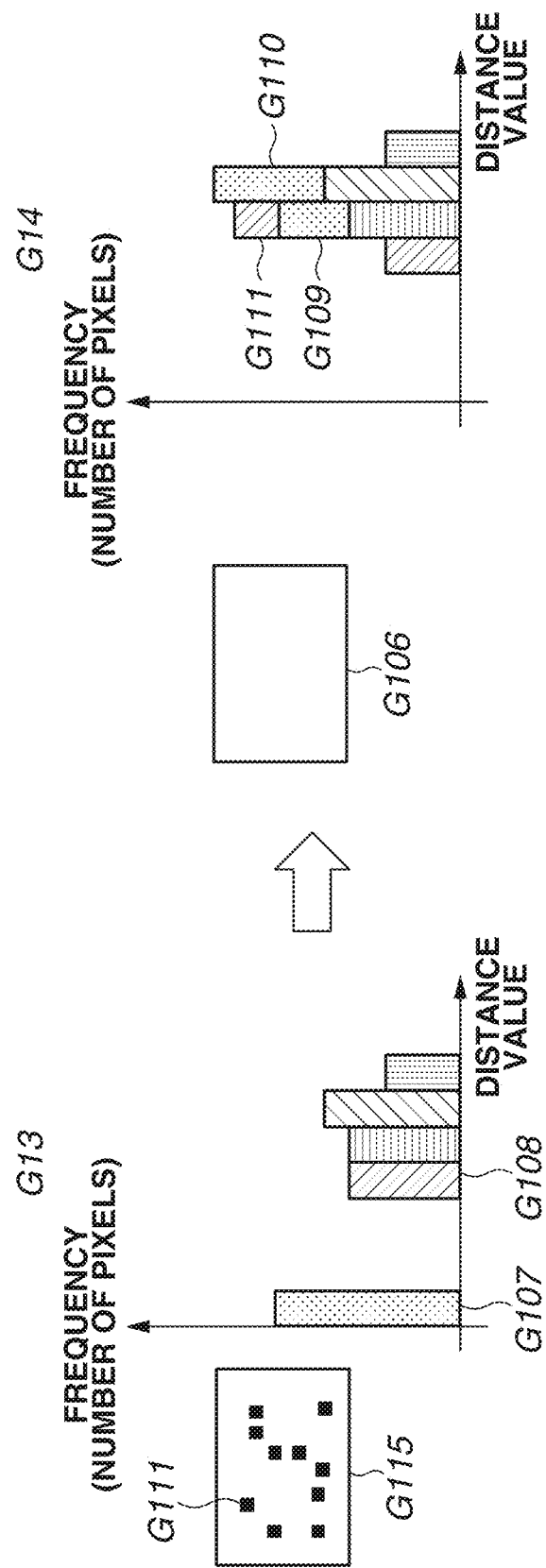
FIG. 10 is a diagram illustrating examples of histograms.

In step S1103, the determination unit 104 determines color data on the histogram, expressing differences between data obtained from the depth image and data obtained from the corrected data. A method for coloring differences between the depth image and the corrected image will be described with reference to FIG. 10. FIG. 10 is a diagram illustrating an example of a histogram expressing differences between the depth image and the corrected image. A depth image G105 includes pixels G111 where depth measurement has failed. A histogram G13 corresponds to the depth image G105. Different graph colors of the bins in the histogram G13 represent the colors displayed in the color bar pattern C104 (FIG. 6). A bin G107 in the histogram G13 indicates the frequency corresponding to the pixels G111 where depth measurement has failed. A corrected image G106 is obtained by the correction unit 102 processing the depth image G105. A histogram G14 corresponds to the corrected image G106. In the histogram G14, sections G109 and G110 represent that the pixels G111. where depth measurement has failed are corrected from the bin G107 into the sections G109 and G110 as a result of the correction into the corrected image G106, The sections G109 and G110 in the histogram G14 are displayed in the same color as that of the bin G107. Some of the pixels corresponding to a bin G108 in the histogram G13 are corrected into a section G111 in the histogram G14 and displayed in the same color as that of the bin G108. In such a manner, the histogram G14 of the corrected image G106 after the correction processing is expressed by using the colors of the respective bins in displaying the histogram G13 of the depth image G105 before the correction processing. The determination unit 104 can generate colored histogram data expressing differences between the depth image and the corrected image as illustrated in the histogram G14 of the corrected image G106. Displaying such a histogram enables the user to visually observe how missing pixels in the depth image have been complemented. A histogram easily readable to the user can thus be presented.

In step S1104, the conversion unit 105 generates image data on the colored histogram and color-converted image data on the depth image based on the colored histogram data.

In step S1105, the output unit 106 outputs the histogram where the depth values obtained based on the image corrected by the correction unit 102 and the depth values included in the depth image are displayed in different colors. Specifically, the output unit 106 outputs histogram data visualizing differences between the histogram generated from the corrected depth image (corrected image) and the histogram generated from the depth image.

By the foregoing processing, differences between the depth image before the correction processing and the corrected image after the correction processing can be expressed by one colored histogram. A histogram easily readable to the user can thus be presented.

Where Representative Values are Used

Figure 11:
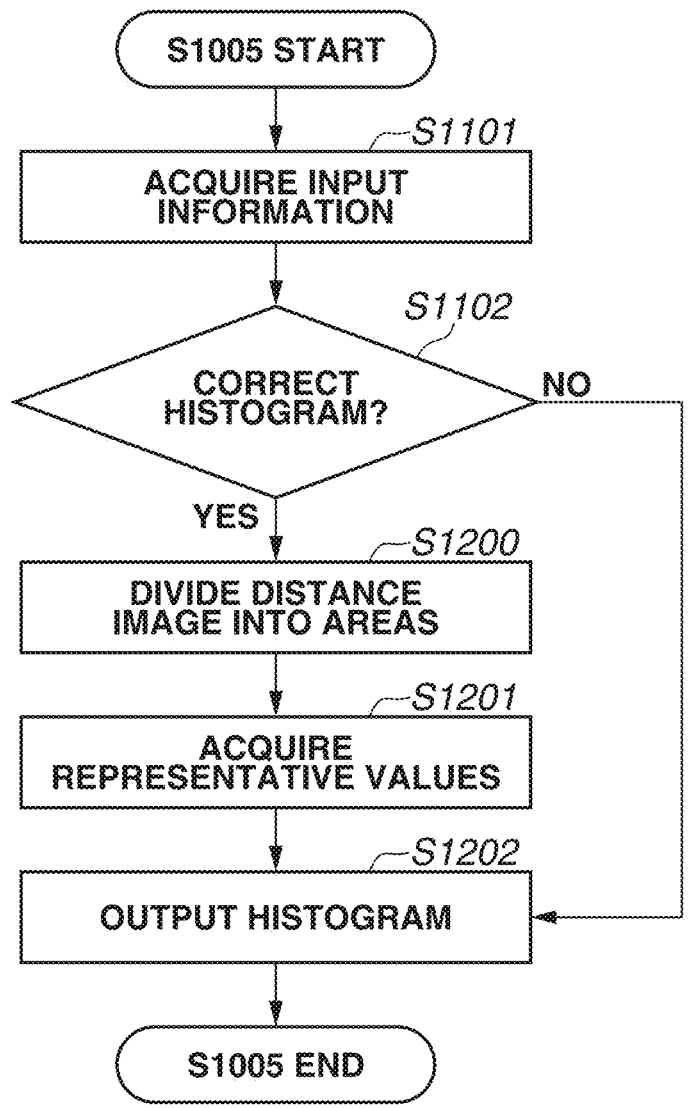
FIG. 11 is a flowchart illustrating a processing procedure to be performed by the information processing apparatus.

In the present processing, the user checks the checkbox U110 about whether to use representative values, and accordingly a histogram where the effect of measurement-failed areas is suppressed is generated without generating a corrected image by correcting the depth values of the depth image including measurement-failed pixels. Such a histogram can express the general outlines of the depth image while compensating information missing in the depth image. Since the histogram is generated in units of areas of the depth image, the processing load is lighter than with pixel-by-pixel processing. A processing procedure thereof will be described with reference to FIG. 11. A histogram is generated based on the flowchart of FIG. 11 illustrating the processing for generating a histogram using representative value.

In step S1101 the information acquisition unit 101 acquires information about the check state of the checkbox U110. The user checks the checkbox U110 about whether to use representative values. The present processing will be described for a case where the user checks the checkbox U110 with the color bar pattern C101 selected for the display color.

In step S1102, the correction unit 102 determines whether to correct the generated histogram. If representative values are used (YES in step S1102), the processing proceeds to step S1200. If representative values are not used (NO in step S1102), the processing proceeds to step S1202.

In step S1200, the division unit 107 divides the depth image into areas associated with predetermined values (averages or medians of the depth values in the respective areas). The division unit 107 here divides the areas by spatial segmentation so that pixels in close pixel positions belong to the same groups. FIG. 12 is a diagram illustrating examples of area division. Examples of the area division method will be described with reference to FIG. 12. A depth image G112 includes pixels (missing pixels) G113 where measurement has failed. A depth image G114 is obtained by dividing the depth image G112 into areas by grid-like lines (grid) G115 of predetermined size. While the area division can be performed by grid-like lines as in this example, the area division method is not limited to the example of division with a grid pattern. Other spatial segmentation methods may be used. For example, if there is an intensity image or color image G116 corresponding to the depth image G112, the division unit 107 performs superpixel processing on the intensity image or color image G116. In other words, the division unit 107 divides the depth image G112 into partial areas based on image features of the intensity image or color image G116 corresponding to the depth image G112. The superpixel processing is typified by Simple Linear Iterative Clustering (SLIC). The division unit 107 may thus perform area division as seen in an image G117, where the areas are divided by superpixel-based lines G118. Specifically, the division unit 107 performs edge detection on the intensity image or color image G116, and divides the corresponding depth image G112 into areas based on the result of the edge detection (image features). This increases the possibilities for pixels having similar depth values to be included in the same areas.

Figure 13:
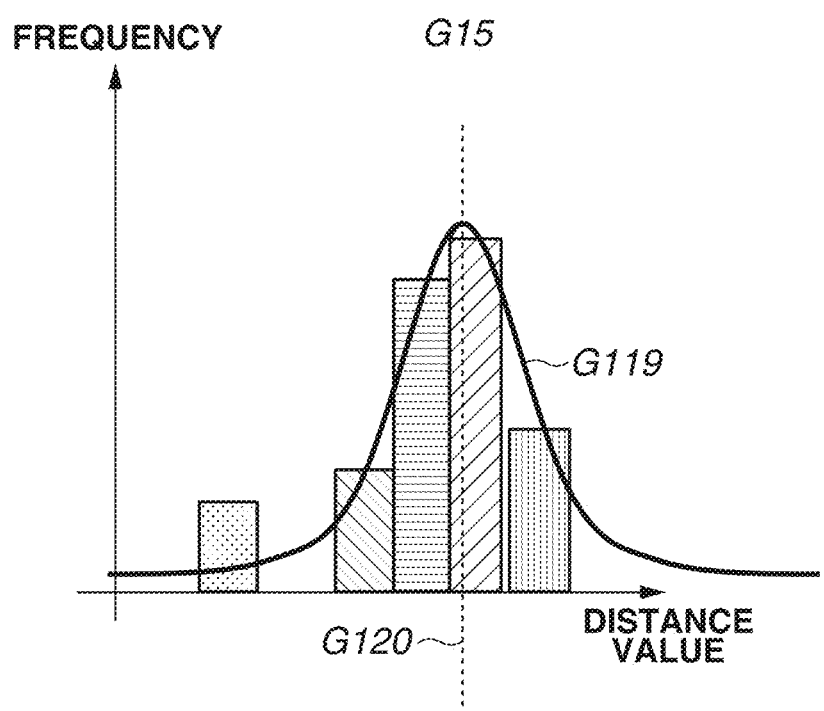
FIG. 13 is a diagram illustrating an example of a method for determining a representative value.

In step S1201, the generation unit 103 generates a histogram by acquiring representative values from the respective partial areas (for example, respective grid cells) divided in step S1200. Specifically, the generation unit 103 may use the median of the depth values of a group of pixels in each area as a representative value. The representative values are not limited to medians. Modes and averages calculated by excluding measurement-failed pixels may be used. FIG. 13 is a diagram illustrating an example of how to determine a representative value by Gaussian fitting. A histogram G15 represents the depth values of a group of pixels in an area. A Gaussian curve G119 is the result of applying Gaussian fitting to the histogram G15. The depth value indicated by a center position G120 of the fitted. Gaussian curve G119 may be used as a representative value. In such a manner, a representative value of depth based on measurement can be determined area by area unless none of the pixels in an area can be measured at all. The generation unit 103 here counts the number of pixels in each area, including measurement-failed pixels.

In step S1202, the output unit 106 outputs a histogram based on the representative values and the numbers of pixels in the respective areas. In the foregoing step S1004, the histogram is described to be generated by adding 1 to the frequency of the bin corresponding to the depth value pixel by pixel. By contrast, the histogram here is generated by adding the number of pixels to the bin corresponding to the representative value area by area.

By the foregoing processing, a histogram representing the distribution of depth values where the effect of the measurement-failed pixels is suppressed can be generated even when the depth image includes measurement-failed pixels. A histogram easily readable to the user can thus be presented.

Where Coordinate Transformation is Performed

In the present processing, a histogram representing the distribution of depth values in the coordinate system of the imaging apparatus 10 is converted into a histogram representing the distribution of depth values in a coordinate system specified by the user, and the converted histogram is displayed. A processing procedure thereof will be described with reference to FIG. 8. In the processing procedure, steps S1104 and S1105 are similar to those in the foregoing case of changing the display color. A description thereof will thus be omitted.

Figure 14:
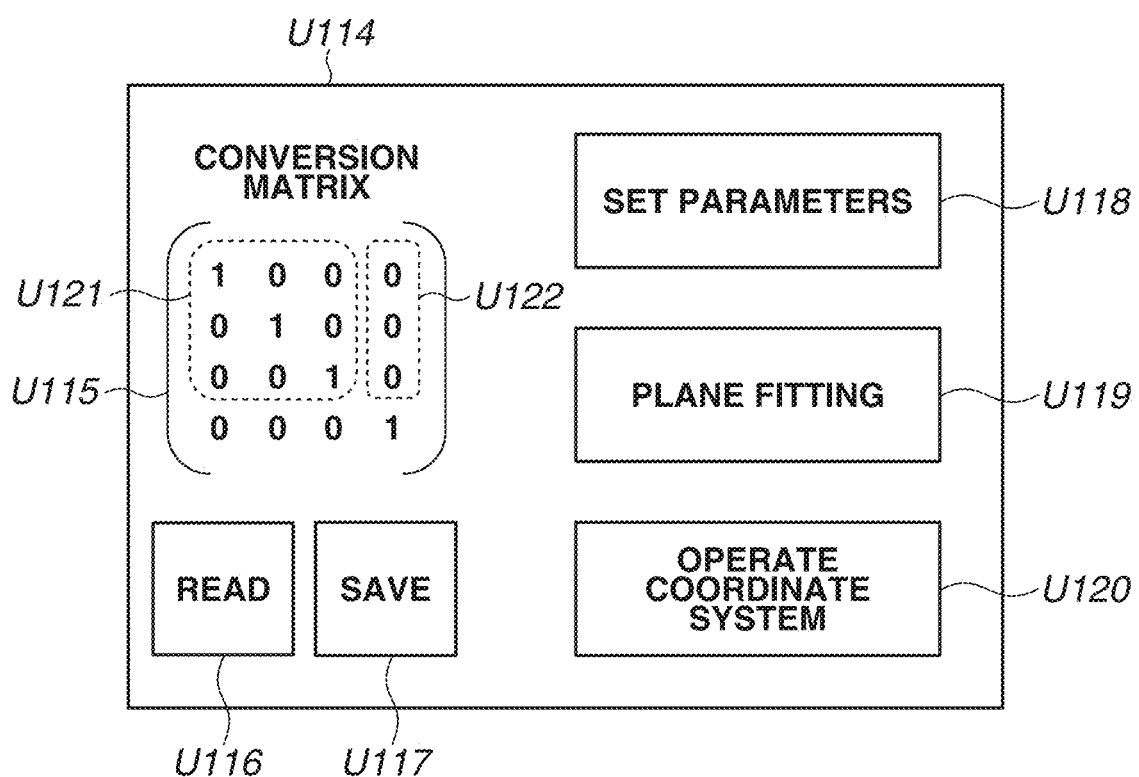
FIG. 14 is a diagram illustrating an example of a GUI for setting coordinate transformation.

In step S1101, the information acquisition unit 101 acquires information about a transformation matrix set by a GUI U114 (see FIG. 14) and internal parameters of the imaging apparatus 10 set by using a parameter setting button U118 (see FIG. 14). If the user clicks or touches the button U111 (see FIG. 7) for performing coordinate transformation, the GUI U114 for making settings for coordinate transformation pops up. FIG. 14 is a diagram illustrating an example of the GUI U114 for making settings for coordinate transformation. The GUI U114 includes a transformation matrix U115, a read button U116, a save button U117, the parameter setting button U118, a plane fitting button U119, and a coordinate system operation button U120. The transformation matrix U115 is one intended to convert the coordinate system of the imaging apparatus 10 into a new coordinate system. The read button U116 is for reading the transformation matrix U115 from a file. The save button U117 is for saving the transformation matrix U115 in a file. The parameter setting button U118 is for setting parameters for converting a depth image into a three-dimensional point group. The plane fitting button U119 is for determining the transformation matrix U115 by plane fitting. The coordinate system operation button U120 is for determining the transformation matrix U115 by directly operating the coordinate system. The transformation matrix U115 includes rotating matrix components U121 for rotating the coordinate system, and translation components U122 for translating the coordinate system. Each button and operation method will now be described. The user can edit the transformation matrix U115 by directly inputting numerical values. An indication that the transformation matrix U115 is not appropriate is displayed if conditions on the transformation matrix U115 are not satisfied. The conditions include that the rotating matrix components U121 constitute an orthogonal matrix satisfying a determinant=1 and that the components in the fourth row of the transformation matrix U115 be (0 0 0 1). For example, text color of inappropriate values in the transformation matrix U115 are changed from black to red. As an example of the transformation matrix U115, suppose that a numerical value is input to the third of the translation components U122. This enables coordinate transformation to offset the depth values of the depth image by the numerical value. If the read button U116 is pressed, a file dialog pops up, where a comma-separated-value (csv) file expressing a transformation matrix can be read to update the transformation matrix U115. If the save button U117 is pressed, the current transformation matrix U115 is saved in a csv file format. If the parameter setting button U118 is pressed, the internal parameters of the imaging apparatus 10, such as focal lengths fx and fy and center positions cx and cy, can be set. The internal parameters may be set by reading a file describing the internal parameters in a csv file format or by the user directly writing the values fx, fy, cx, and cy. Based on the internal parameters set here, the depth image can be converted into a three-dimensional point group in the coordinate system of the imaging apparatus 10. A three-dimensional position (X, Y, Z) in the coordinate system of the imaging apparatus 10 can be determined by the following equations:

$$X=pd(px-cx)/fx,$$

$$Y=pd(py-cy)/fy, \text{ and} \quad \text{(Eq. 1)}$$

$$Z=pd,$$

where pd is a depth value at a pixel position (px, py) of the depth image. When the plane fitting button U119 is pressed, a GUI displaying a three-dimensional point group into which the depth image is converted further pops up. The three-dimensional point group is a group of points representing three-dimensional positions in the coordinate system of the imaging apparatus 10. If a group of a plurality of points is selected on the GUI (hereinafter, referred to as a three-dimensional point group display GUI), a plane fitted to the point group can be obtained. The fitted plane is expressed by the following equation:

$$AX+BY+CZ+D=0. \quad \text{(Eq. 2)}$$

Here, a vector (A, B, C) has a magnitude of 1 and represents the normal direction of the plane. The rotating matrix components U121 of the transformation matrix U115 are set as a rotating matrix such that the Z direction in the new coordinate system coincides with the vector (A, B, C). If the coordinate system operation button U120 is pressed, the three-dimensional point group display GUI further pops up. The user can freely rotate and translate a coordinate system object including a point of origin and X, Y, and Z axes representing the new coordinate system by mouse operations or touch operations on the three-dimensional point group display GUI. If the coordinate system object is moved, a transformation matrix U115 for converting the coordinate system of the imaging apparatus 10 into that coordinate system is displayed. The user sets the transformation matrix U115 by using such a GUI U114 for making settings for coordinate transformation.

In step S1102, the correction unit 102 determines whether to correct the histogram based on the information for performing coordinate transformation. If coordinate transformation is to be performed (YES in step S1102), the processing proceeds to step S1103, If coordinate transformation is not to be performed (NO in step S1102), the processing proceeds to step S1105. In step S1103, the determination unit 104 determines a method for converting the coordinates. In step S1104, the conversion unit 105 initially converts the depth image into a three-dimensional point group in the coordinate system of the imaging apparatus 10 based on Eq. 1. Next, the conversion unit 105 converts the three-dimensional point group (X, Y, Z) into a new coordinate system (Xn, Yn, Zn) by using a transformation matrix P. The conversion equation is expressed as follows:

$$\begin{pmatrix} Xn \\ Yn \\ Zn \\ 1 \end{pmatrix} = P \begin{pmatrix} X \\ Y \\ Z \\ 1 \end{pmatrix}. \quad \text{(Eq. 3)}$$

The distribution of Zn in the new coordinate system is then generated as a histogram. Since the method is similar to that in step S1004 except that the depth value is replaced with Zn, a description thereof will be omitted. By the foregoing processing, a histogram representing the distribution of depth values in a coordinate system specified by the user can be generated.

With the foregoing configuration, a histogram with improved user convenience can be generated and drawn by determining the display range of the histogram based on the information about the range sensor and further coloring the histogram based on reliability. Various modifications can also be made to the methods for generating and drawing the histogram based on user input by using the GUIs.

The conversion unit 105 and the output unit 106 according to the first exemplary embodiment are described to perform image conversion and image display for displaying a histogram. However, this is not restrictive. For example, if the shape of the distribution of the histogram is used for matching or object detection, the conversion unit 105 may convert the histogram into a multidimensional vector, and the output unit 106 may output the multidimensional vector. In such a manner, the information processing apparatus 1 can be used for object similarity calculation and object detection using a histogram.

The output unit 106 may output a corrected histogram by using a trained model. As employed herein, a trained model refers to a neural network-based network structure and its parameters for outputting a result corresponding to an input image based on the input image. Specific examples include a convolutional neural network (CNN). For example, the output unit 106 uses a trained model for estimating an appropriate range of depth values with a depth image or corrected image as an input. Here, the trained model learns what outliers often appear in depth images, and estimates a range including many effective depth values as the range of depth values. Since measurable depth values differ from one measurement apparatus to another, the trained model may be trained in advance with areas that the measurement apparatus is unable to measure and ground truth values thereof. In such a case, the model is trained to estimate the depth values in the areas where measurement is difficult. Here, training (updating of parameters) refers to processing that includes setting an image on an input layer of the training model, setting a ground truth value for the image on an output image layer, and adjusting the parameters of the neural network so that an output calculated through the neural network approaches the set ground truth value. The trained model may be stored in the information processing apparatus 1, or stored in an external apparatus. The use of the trained model enables efficient output of a histogram easy for the user to use.

In the example of the case <where representative values are used> according to the first exemplary embodiment, the area division in step S1200 is described to be performed by using grid-like lines or by SLIC. However, this is not restrictive. For example, a network model that outputs a group of parameters controlling the area division result with an intensity image or depth image as an input may be obtained by training. The closer a histogram using representative values is to one generated from a noiseless depth image, the better the histogram is considered to be. Thus, the network model is trained to output area division parameters that enable output of a result as good as possible. For example, an area division network model (trained model) is trained when the computing load is low or in a training phase such as a user-specified training period. The training method is not limited in particular. For example, reinforcement learning may be used. Reinforcement learning is a method using a model where an agent takes actions to change a state and gain a reward, and the model is trained to determine actions to gain as much reward as possible. The agent takes actions to change the area division parameters and accordingly changes the state of the area division result for determining representative values. The closer the histogram using the representative values is to the histogram generated from a noiseless depth image, the higher the reward is set be. Since noiseless depth images are difficult to obtain, a corrected image generated by the correction processing described in the first exemplary embodiment may be used as a noiseless depth image. Each time a depth image and an intensity image are input during use of the present information processing system, the data on the images is stored and used for training. If a corrected image is generated during use of the present information processing system, the corrected image may be stored and used for training. If the processing for generating a corrected image is not performed during use of the present information processing system a corrected image may be generated in a training phase. By performing reinforcement learning in such a manner, parameters for optimum area division with respect to the characteristics of the depth and intensity images input by the user can be obtained. Alternatively, the foregoing area division may be learned by supervised learning. Depth images and color images are prepared as teaching data, and noiseless depth images as the ground truth values. Data obtained by grouping pixels having a predetermined range of depth values in a depth image may be used as a ground truth value, A trained model is generated by training a neural network to learn image features of pixels having similar depth values by using the teaching data. The trained model may be stored in the storage unit of the information processing apparatus 1 or in an external apparatus. In performing area division, a depth image and a color image acquired are input to the training model, and accordingly the depth image is divided into partial areas. The partial areas are associated with respective representative values (averages or medians) of depth values to generate a histogram. Performing the area division by the trained model enables accurate representation of the general outlines of the histogram, and accordingly a histogram easily readable to the user can be displayed.

The display methods described above may be used in combination. For example, the display methods for the cases <where representative values are used> and <where differences before and after processing are visualized> may be combined. Specifically, the depth image is complemented based on the flowchart of FIG. 11, and then the flowchart of FIG. 8 is applied to display differences in depth data before and after the complementation. A histogram easily readable to the user can be presented by combining the foregoing display methods.

In the first exemplary embodiment, an example of determining the depth range of the histogram based on the information about the range sensor with the depth image as an input and devising coloring in drawing the histogram has been described. An example of generating and drawing a highly convenient histogram based on user input by using the GUIs has also been described. In a second exemplary embodiment, an example of setting an area on an intensity image or color image by the input of the intensity image or color image in a pixel-to-pixel correspondence with a depth image and highlighting an area corresponding to that area on a histogram of the depth image will be described.

A specific example will be described with reference to FIG. 21. Suppose, for example, that a part W210 being conveyed on a belt conveyor in a plant is inspected by using a depth image and a color image. Parts W210 to W213 are objects having a recess in the center. Color images I210, I211, and I212 are images captured in a time series of parts being conveyed on the belt conveyor. Histograms G211, G212, and G213 are generated from the respective corresponding depth images. For example, suppose that the user selects the recessed portion in the center of the part W210 in the image I210 by a GUI. Then, a bin G2100 including the measurement result of the recessed portion of the part W210 is highlighted in the histogram G211 corresponding to the image I210. Similarly, if the shaded area of the part W211 in the image I211 is selected, a bin G2101 of the histogram G212. is emphasized. In the present exemplary embodiment, the user can set an area on the intensity image or color image of the same scene as that the user actually observes. This enables intuitive, easier specification of the area than on a depth image. The resulting histogram is easily readable to the user since the actual measurement values of the corresponding area in the color image can be observed in the histogram.

Figure 15:
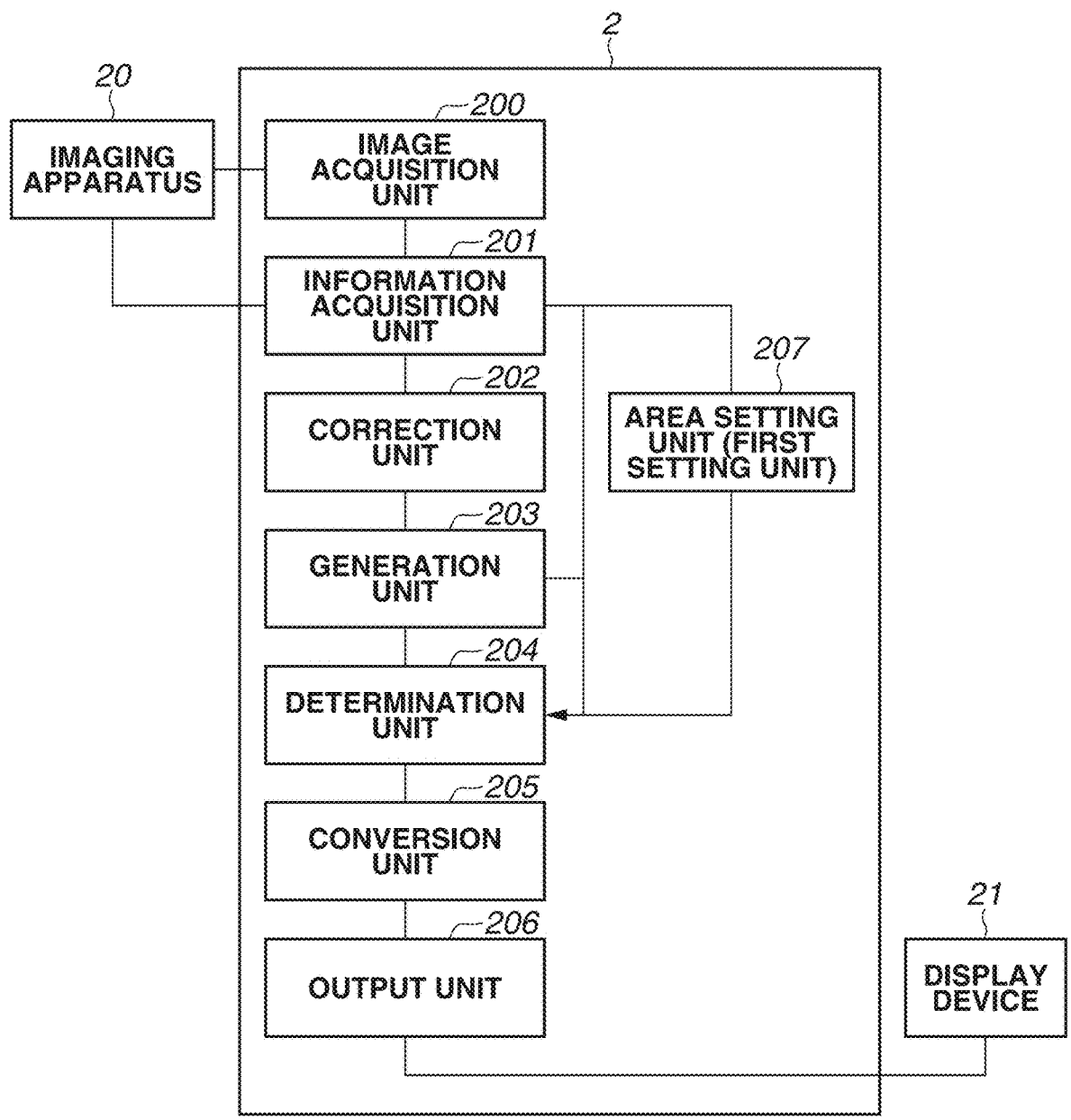
FIG. 15 is a diagram illustrating a functional configuration example of an information processing apparatus.

FIG. 15 is a diagram illustrating a functional configuration example of an information processing apparatus according to the second exemplary embodiment. An information processing apparatus 2 illustrated in FIG. 15 includes an image acquisition unit 200, an information acquisition unit 201, a correction unit 202, a generation unit 203, a determination unit 204, a conversion unit 205, an output unit 206, and an area setting unit (first setting unit) 207. The information processing apparatus 2 in FIG. 15 is connected to an imaging apparatus 20 and a display device 21. The information processing apparatus 2 according to the present exemplary embodiment is similar to the information processing apparatus 1 according to the first exemplary embodiment illustrated in FIG. 2. A description of similar functions will be omitted, and the imaging apparatus 20, the image acquisition unit 200, the information acquisition unit 201, and the area setting unit (first setting unit) 207 that are different will be described.

The imaging apparatus 20 captures a depth image and an intensity image or color image, and outputs the captured images to the image acquisition unit 200. The following description will be given on the assumption that a depth image and a color image are captured here. The color image is aligned with the depth image, so that a point in a scene is observed at the same pixel positions. Examples of the imaging apparatus 20 include a stereoscopic camera and an RGB-D camera.

The image acquisition unit 200 acquires the depth image and the color image from the imaging apparatus 20, and outputs the depth image and the color image to the information acquisition unit 201. The information acquisition unit 201 has a function of acquiring the color image and acquiring information about user input on the color image as well, in addition to the functions of the information acquisition unit 101 according to the first exemplary embodiment. The information acquisition unit 201 outputs such information to the correction unit 202, the generation unit 203, the determination unit 204, and the area setting unit 207. The determination unit 204 has a function of determining information for specifying a pixel area on the color image as well, in addition to the functions of the determination unit 104 according to the first exemplary embodiment. The determination unit 204 outputs the information to the conversion unit 205 along with the histogram, the depth image, and the color image, and determination information about the histogram, the depth image, and the color image. The conversion unit 205 receives the histogram, the depth image, the color image, and their determination information from the determination unit 204, and converts the histogram, the depth image, and the color image into image data to be displayed on the display device 21. The output unit 206 receives the image data (histogram image data, depth image data, and color image data) from the conversion unit 205, and outputs the image data to the display device 21. The output unit 206 also outputs a GUI as appropriate. A specific example of the display device 21 is a display. The display device 21 draws and displays the histogram image data, the depth image data, the color image data, and the GUI output from the output unit 206 in predetermined regions. The area setting unit 207 (first setting unit) sets an area on the color image based on information input by the user. The user specifies the area to observe depth values on the color image by using the GUI.

Figure 16:
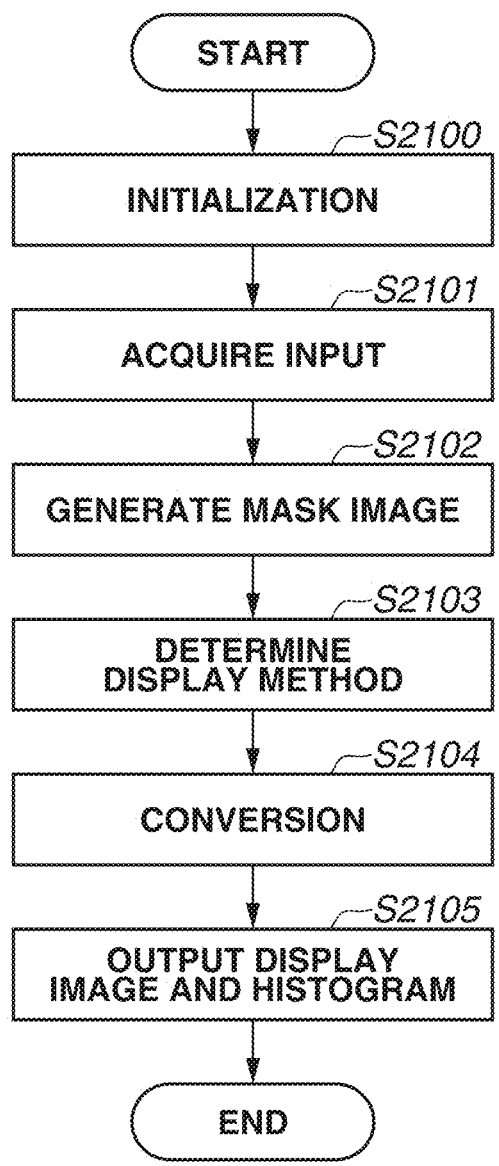
FIG. 16 is a flowchart illustrating a processing procedure to be performed b the information processing apparatus.

Next, a processing procedure according to the present exemplary embodiment will be described. Processing up to the generation and display of the histogram of the depth image is similar to that in the flowchart of FIG. 4 according to the first exemplary embodiment. A description thereof will thus be omitted. In the present exemplary embodiment, after the execution of the flowchart of FIG. 4, an area is set on the color image based on user input, and a histogram area corresponding to the area is highlighted. FIG. 16 is a flowchart illustrating a processing procedure for setting an area based on user input and displaying a highlighted histogram. The processing procedure will now be described.

In step S2100, the information processing apparatus 2 performs initialization. In step S2101, the information acquisition unit 201 acquires an input for setting an area, and outputs the input to the area setting unit 207. The user makes the input for setting an area on the color image. Examples of the method for making the input for setting an area include the following: specifying a pixel on the color image; specifying a plurality of pixel areas on the color image; specifying a color range on the color image (for example, a red area of 180<R<250, G<50, and B<50); specifying an object area by applying an object detection or other image processing algorithm (for example, specifying a circular area by circle detection); and specifying a predetermined object area by template matching. However, the method is not limited thereto.

In step S2102, the area setting unit 207 receives the information (input) for setting the area, and initially generates a mask image that corresponds to the specified area and has the same resolution as that of the color image. If a pixel or a plurality of pixel areas is specified, a mask image corresponding to the area(s) is generated. If a color range is specified on the color image, a mask image corresponding to a pixel area covering the range is generated. If the object detection or other image processing algorithm is applied, a mask image corresponding to the resulting pixel area is generated. For example, the mask image is a binary image having a value of 1 for the pixels in the specified area and a value of 0 in the other pixel areas.

In step S2103, the determination unit 204 identifies the image to be displayed by using the mask image and a corresponding area of the histogram, and determines a display method for emphasizing the area. The image to be displayed (hereinafter, may be referred to as "display image") may be either of the depth image and the color image. The user can switch the image to be displayed by using a not-illustrated GUI. There is a pixel-to-pixel correspondence between the image to be displayed and the mask image. The determination unit 204 thus extracts the same pixel area on the image to be displayed as the masked pixel area, and edits color data to emphasize the pixel area. Examples of the method for emphasizing the area include, but not limited to, the following: converting the area into a specific color such as red and blue, switching color at regular time intervals as if blinking during display, and darkening the color of the unmasked pixel areas.

Next, the determination unit 204 identifies the masked pixel area on the depth image corresponding to the histogram, and extracts a depth value group in the area. The determination unit 204 then edits color data to emphasize the area of the histogram corresponding to the depth value group. FIG. 17 is a diagram illustrating an example of the method for emphasizing the histogram. In FIG. 17, a histogram G16 corresponds to a depth image (or color image corresponding to a depth image) G120. A depth image (or color image corresponding to a depth image) G121 similar to the depth image (or color image corresponding to a depth image) G120 includes a partial area representing a masked pixel area G122. A histogram G17 corresponds to the depth image G121. The histogram G17 includes a frequency area G123 of the depth value group corresponding to the masked pixel area G122. The determination unit 204 edits the color data on the frequency area G123 of the depth values corresponding to the masked pixel area G122. Examples of the method for emphasizing the histogram include, but not limited to, the following: converting the corresponding histogram area into a specific color such as red and blue, switching the color at regular time intervals as if blinking during display, and darkening the color of the histogram areas corresponding to the unmasked pixel areas. For example, the color of the frequencies of the histogram G17 corresponding to the depth value group of the masked pixel area G122 may be all changed. In such a manner, the determination unit 204 determines color information as determination information about the display image and the histogram, and generates data on the colored display image and data on the colored histogram. Since the user can select the area to be observed from the depth image or the color image corresponding to the depth image and get a general idea of the actual measurement values in that area, a histogram easily readable to the user can be generated.

In step S2104, the conversion unit 205 generates image data on the colored display image and image data on the colored histogram. The specific method is similar to that of step S1004, and accordingly the conversion unit 205 converts the data on the colored depth image and the data on the colored histogram into the respective pieces of image data. In step S2105, the output unit 206 makes an output to display the display image and the histogram on the GUI.

By the foregoing processing, the histogram area of the depth image corresponding to the area set on the color image and the corresponding area on the color image can be highlighted.

The information processing apparatus 2 can set an area by using object detection and other existing algorithms applicable to an intensity image or color image, and analyze the histogram of the depth image corresponding to the area. With the foregoing configuration, the user can intuitively analyze the correspondence between the depth values and the scene by setting an area on the color image based on a desired condition, and visualizing the histogram area corresponding to the area with emphasis.

In the second exemplary embodiment, the area is described to be set on the intensity image or color image. However, this is not restrictive. For example, the area may be set on the depth image in a similar manner to that in step S2100.

The determination unit 204 and the conversion unit 205 according to the second exemplary embodiment are described to edit the color data on the histogram and the display image and convert the resultant into image data. However, this is not restrictive. For example, if a pixel is specified by user input, the determination unit 204 identifies the corresponding pixel in the depth image. The determination unit 204 obtains the pixel position (px, py) in the color image and the depth value pd of the pixel. The determination unit 204 can then determine the three-dimensional position (X, Y, Z) in the coordinate system of the imaging apparatus 20 by using Eq. 1. The determination unit 204 may determine the three-dimensional position as information for specifying a pixel area. The conversion unit 205 converts the information about the three-dimensional position into a GUI format for output.

Figure 18:
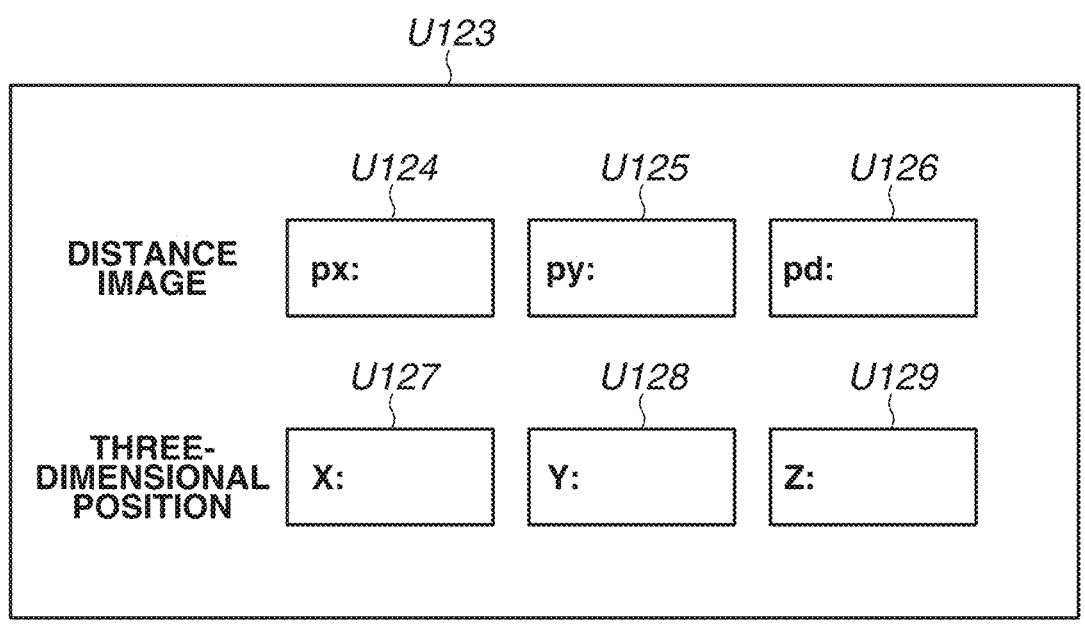
FIG. 18 is a diagram illustrating an example of a GUI.

FIG. 18 is a diagram illustrating an example of the GUI indicating the three-dimensional position of a pixel in the depth image. A GUI U123 indicates a pixel in the depth image and the three-dimensional position of the pixel. The GUI U123 appears as a popup window. If the user specifies a pixel position (px, py) on the depth image or color image by using a mouse, the pixel position is displayed in areas U124 and U125. The depth value pd at the pixel position (px, py) is displayed in an area U126. The values of the three-dimensional position (X, Y, Z) in the coordinate system of the imaging apparatus 20, calculated by using Eq. 1, are displayed in areas U127, U128, and U129, respectively. In such a manner, the three-dimensional position at the user-specified pixel position can be checked.

In the second exemplary embodiment, the histogram area corresponding to an area set on the intensity image or color image is described to be highlighted. A third exemplary embodiment deals with an example where, when an area is selected on the histogram, a pixel area or areas corresponding to the area is/are highlighted on the intensity image or color image, A specific example will be described with reference to FIG. 22. Color images I2200 and I2201 include works put in bulk in a container. A work W220 is the foremost one among the plurality of works, A histogram G22 is generated from a depth image corresponding to the color image I2200. A histogram G23 is generated from a depth image corresponding to the color image I2201. Suppose that the user selects the bin including the smallest depth value in the histogram G22 by the GUI. Then, the work W220 included in the color image I12200 is highlighted in color. If the user selects a bin G221 including relatively large depth values in the histogram G23, works W221 near the bottom of the container are emphasized. In the present exemplary embodiment, the user can intuitively figure out the correspondence between the distribution of depth values and the observed scene based on the display of the distribution of depth values by the histogram.

Figure 19:
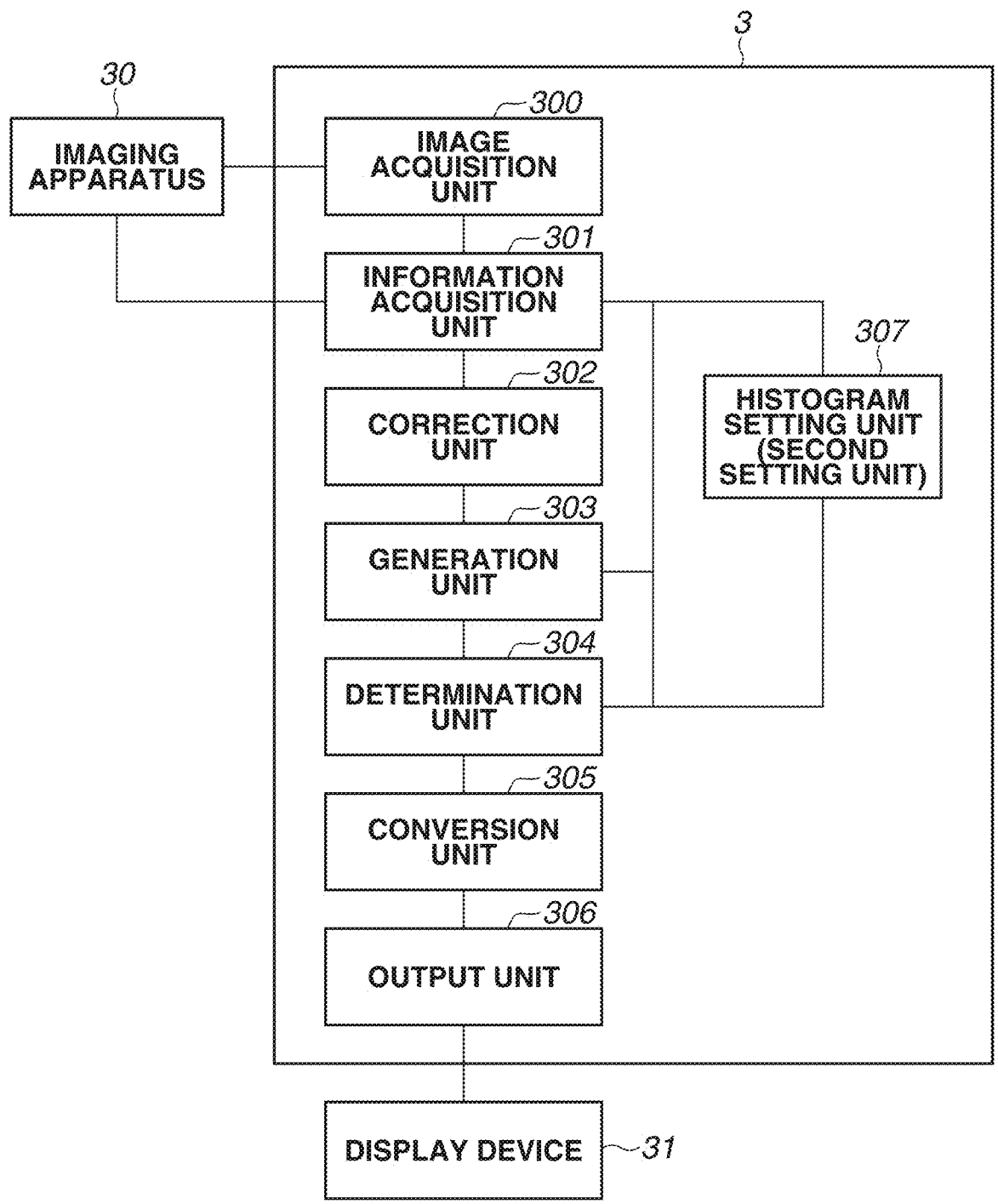
FIG. 19 is a diagram illustrating a functional configuration example of an information processing apparatus.

FIG. 19 is a diagram illustrating a functional configuration example of an information processing apparatus according to the third exemplary embodiment. The functional configuration example of an information processing apparatus 3 illustrated in FIG. 19 is similar to that illustrated in FIG. 15. A description of similar functions will be omitted, and an information acquisition unit 301, a histogram setting unit 307 (second setting unit), and an output unit 306 that are different will be described.

Figure 20:
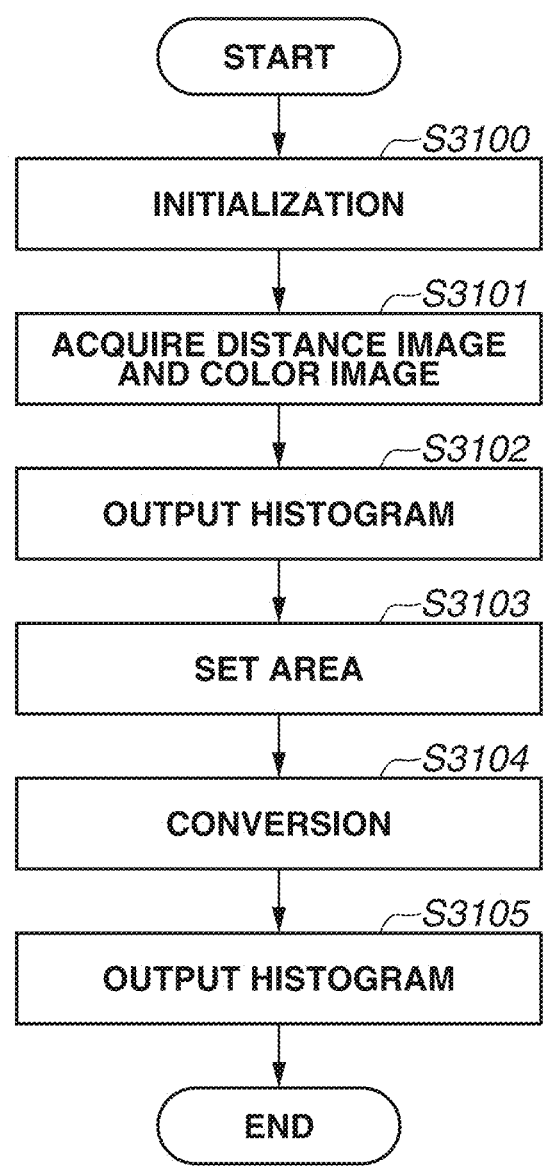
FIG. 20 is a flowchart illustrating a processing procedure to be performed b the information processing apparatus.

The information acquisition unit 301 has a function of acquiring a color image and acquiring information about user input to a generated histogram as well, in addition to the functions of the information acquisition unit 101 according to the first exemplary embodiment. The information acquisition unit 301 outputs such information to a correction unit 302, a generation unit 303, a determination unit 304, and the histogram setting unit 307 (second setting unit). The histogram setting unit 307 (second setting unit) sets a class specified by the user in the generated histogram. The output unit 306 outputs the color image so that the pixels corresponding to the class set by the histogram setting unit 307 are highlighted. Next, a processing procedure according to the present exemplary embodiment will be described. Processing up to the generation and display of the histogram of the depth image is similar to that in the flowchart of FIG. 4 according to the first exemplary embodiment. A description thereof will thus be omitted. In the present exemplary embodiment, after the execution of the flowchart of FIG. 4, an area is set on the histogram based on user input, and a color image area corresponding to the area is highlighted. FIG. 20 is a flowchart illustrating a processing procedure for setting an area on the histogram based on user input and displaying a highlighted color image. The processing procedure will now be described. Since steps S3104 and S3105 are similar to steps S2104 and S2105 in FIG. 16, a description thereof will be omitted.

In step S3100, the information processing apparatus 3 performs initialization. In step S3101, the information acquisition unit 301 acquires a depth image obtained from the result of the measurement of depth values from the measurement apparatus to target objects by the measurement apparatus and a color image corresponding to the depth image. In step S3102, the generation unit 303 outputs the histogram representing the distribution of the depth values based on the depth image.

In step S3103, the histogram setting unit 307 (second setting unit) sets a class specified by the user in the generated histogram. The user makes an input for setting an area on the histogram. Examples of the method for making the input for setting an area on the histogram include, but not limited to, the following: specifying a depth value in the histogram; specifying a plurality of depth value ranges in the histogram as the area; specifying a depth range matching a predetermined frequency condition in the histogram as the area (for example, specifying a depth range including depth values the frequency of which is less than 100); and specifying a depth range as the area based on a feature of the shape (waveform) of the histogram (for example, specifying a depth range where the gradient of the histogram has an absolute value greater than or equal to a threshold). In step S3104, the conversion unit 305 extracts pixels including the depth values corresponding to the class set on the histogram from the depth image, and performs conversion to change the display method of the pixels. The conversion unit 305 receives information for setting the area on the histogram, and initially extracts the specified depth value group. For example, the conversion unit 305 extracts depth values in the range of 410 to 440 and in the range of 510 to 550 as a depth value group. The conversion unit 305 then generates a mask image that includes pixel areas satisfying the range of the depth value group in the depth image. For example, the mask image is a binary image that has the same resolution as that of the depth image, and has a value of 1 in the pixel areas satisfying the range of the depth value group and a value of 0 in the other pixel areas. The determination unit 304 determines the display method for emphasizing the corresponding areas in the histogram and the image to be displayed by using the depth value group and the mask image.

In the histogram, the data on the bin(s) corresponding to the depth value group in the user-specified area is highlighted. Examples of the method for emphasizing the area of the histogram include, but not limited to, the following: converting the color of the corresponding bin area(s) into a specific color; converting the color of the corresponding bins into colors different from one bin to another; switching the color at regular time intervals as if blinking during display; and darkening the color of the bin areas other than the corresponding bin(s). There is a pixel-to-pixel correspondence between the image to be displayed and the mask image. The determination unit 204 thus extracts the same pixel area(s) on the image to be displayed as the masked pixel area(s), and edits color data to emphasize the area(s). The image to be displayed (display image) may be emphasized by a method similar to that for emphasizing the histogram. Emphasizing the display image by the same method as with the histogram facilitates recognition of the correspondence between the histogram and the display image. However, this is not restrictive. The method for emphasizing the histogram may be different from that for emphasizing the image to be displayed. In step S3105, the output unit 306 outputs the histogram to a display device 31 so that the pixels corresponding to the class set by the histogram setting unit 307 are highlighted in the color image.

By the foregoing processing, the pixel areas corresponding to the class set on the histogram can be highlighted in the color image.

Figure 21:
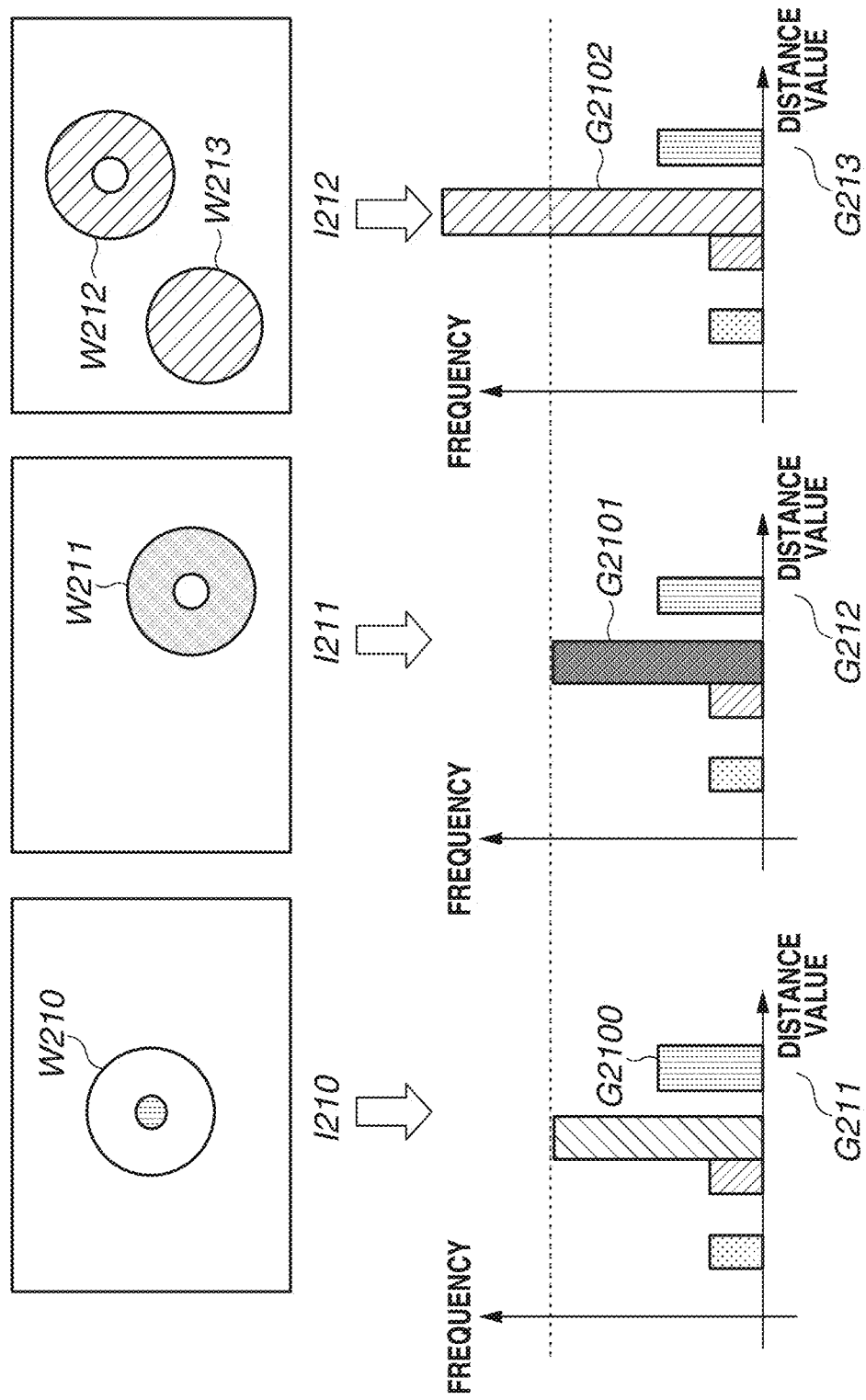
FIG. 21 is a diagram illustrating examples of color images and corresponding histograms.

As an application example of the present exemplary embodiment, the present exemplary embodiment can be applied to the object detection in FIG. 21. For example, areas including depth values corresponding to a bin G2102 standing out above a reference value indicated by the dotted line in the histogram G213 may be highlighted like an image I212. An average of the frequencies of all the bins or characteristic bins (for example, a modal bin) in depth images captured up to that point is used as the reference value. A normal part W212 and a reversed part W213 are simultaneously captured in the image I212. The bin G2102 in the histogram G213 thus shows a frequency higher than normal. A histogram easy for the user to use can be generated since the reference value can be set based on actual measurement values.

The present exemplary embodiment can also be used to generate training data for supervised learning. Suppose that in FIG. 22, works such as the works W220 and W221 are put in bulk in a container, and a robot apparatus recognizes the positions of the works from a depth image obtained by capturing the works and picks a work. To train the robot apparatus to pick the topmost one of the works (work at the smallest depth from the imaging apparatus) in the container, for example, training data where works in the depth image that can be picked are given a ground truth value (GT) is used. In other words, pixels given the GT value, or the ground truth pixels, are pixels of the topmost one of the works. The user can give the ground truth value GT by checking the depth values of the works in the histogram. The training data can thus be efficiently generated.

With the foregoing configuration, the user can intuitively analyze correspondence between the depth values and the scene by setting an area including a range of depth values on the histogram image based on a desired condition, and visualizing the pixel area(s) of the color image corresponding to the area with emphasis.

Other Exemplary Embodiments

In the first exemplary embodiment, one histogram is described to be generated and displayed with respect to one depth image. However, this is not restrictive. For example, the information processing apparatus 1 may acquire a plurality of frames of depth images, generate histograms for the respective depth images, and perform analysis by using the plurality of histograms. In such a case, the information processing apparatus 1 is configured to output statistical information about the plurality of histograms, including a maximum value, a minimum value, an average, a median, deviations, and a sum total of the frequencies in each bin. In such a manner, for example, depth images can be acquired at regular time intervals, and temporal changes in the scene can be analyzed on the histograms. The information processing apparatus 1 can also be configured to be able to output the amounts of change in the frequencies of the respective bins aside from the statistical information, in which case a time series of changes can be analyzed.

The exemplary embodiments can also be implemented by executing the following processing. The processing includes supplying software (program) for implementing the functions of the foregoing exemplary embodiments to a system or an apparatus via a data communication network or various storage media. The processing further includes reading and executing the program by a computer (or CPU or microprocessing unit (MPU)) of the system or apparatus. The program may be recorded and provided on a computer-readable recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036704, filed Feb. 28, 2019, which is hereby incorporated by reference herein in its entirety.

What is claimed is:

1. An information processing apparatus comprising:
one or more processors programmed to cause the apparatus to function as:
an acquisition unit configured to acquire depth information indicating a depth value from a measurement apparatus to a target object by using the measurement apparatus;
a second acquisition unit configured to acquire input information for specifying a display range of a histogram to a range specified by a user; and
an output unit configured to output the histogram, within the range indicated by the input information, representing a distribution of a plurality of the depth values based on the acquired depth information so that a frequency of a class including a predetermined depth value to be applied when depth value that is not valid is obtained is reduced.

2. The information processing apparatus according to claim 1, wherein the acquisition unit is configured to acquire the depth information where a value of 0, infinity, or a predetermined negative value is applied to an area where the measurement apparatus fails to obtain a valid depth value.

3. The information processing apparatus according to claim 1, wherein the output unit is configured to output the histogram within a range of depth values measurable by the measurement apparatus based on the range of depth values measurable by the measurement apparatus.

4. The information processing apparatus according to claim 1, wherein the one or more processors are programmed to further cause the apparatus to function as a third acquisition unit configured to acquire reliability indicating confidence of the depth value in the depth information,
wherein the output unit is configured to output the histogram where a class including a depth value the reliability of which is higher than a predetermined value is emphasized based on the reliability.

5. The information processing apparatus according to claim 1, wherein the one or more processors are programmed to further cause the apparatus to function as a determination unit configured to determine a display method of the histogram based on color specified by a user,
wherein the output unit is configured to output the histogram by using the display method determined by the determination unit.

6. The information processing apparatus according to claim 1, wherein the acquisition unit is configured to acquire a depth image obtained from the depth information.

7. The information processing apparatus according to claim 6, wherein the one or more processors are programmed to further cause the apparatus to function as a correction unit configured to correct a pixel where a measurement result of the measurement apparatus is a depth value outside a predetermined range among pixels constituting the depth image,
wherein the output unit is configured to output the histogram where a frequency of a class including the depth value outside the predetermined range is reduced based on the depth image corrected by the correction unit.

8. The information processing apparatus according to claim 7,
wherein the correction unit is configured to correct the depth image on the pixel where the measurement result of the measurement apparatus is the depth value outside the predetermined range by using a depth value included in a pixel near the pixel, and wherein the output unit is configured to output the histogram where a frequency of a class including a depth value within the predetermined range is complemented based on the depth image corrected by the correction unit.

9. The information processing apparatus according to claim 7, wherein the output unit is configured to output the histogram where a depth value included in the depth image and a depth value obtained based on the depth image corrected by the correction unit are displayed in different colors.

10. The information processing apparatus according to claim 6, wherein the one or more processors are programmed to further cause the apparatus to function as a division unit configured to divide the depth image into areas associated with respective predetermined values, wherein the output unit is configured to output the histogram based on the values associated with the areas divided by the division unit.

11. The information processing apparatus according to claim 10, wherein the division unit is configured to divide the depth image into a grid of predetermined size, and wherein the output unit is configured to output the histogram based on depth values associated with respective cells of the grid.

12. The information processing apparatus according to claim 11, wherein the division unit is configured to divide the depth image into partial areas based on an image feature of a color image corresponding to the depth image, and wherein the output unit is configured to output the histogram based on depth values associated with the respective partial areas.

13. The information processing apparatus according to claim 11, wherein the division unit is configured to divide the depth image by using a trained model that outputs partial areas obtained by dividing the depth image with the depth image and a color image corresponding to the depth image as inputs, and wherein the output unit is configured to output the histogram based on depth values associated with the respective partial areas.

14. The information processing apparatus according to claim 6, wherein the one or more processors are programmed to further cause the apparatus to function as a first setting unit configured to set an area specified by a user in a color image corresponding to the depth image, wherein the output unit is configured to output the histogram where a class including a depth value included in the area set by the first setting unit is emphasized.

15. An information processing apparatus comprising:
one or more processors programmed to cause the apparatus to function as:
an acquisition unit configured to acquire a depth image obtained from a result of measurement of a depth value from a measurement apparatus to a target object by the measurement apparatus and a color image corresponding to the depth image;

an output unit configured to output a histogram representing a distribution of the depth values based on the depth image;

a setting unit configured to set a class specified by a user in the histogram; and a display unit configured to display the color image where a pixel corresponding to the class set by the setting unit is emphasized.

16. An information processing apparatus comprising:
one or more processors programmed to cause the apparatus to function as:
an acquisition unit configured to acquire depth information obtained from a result of measurement of a depth value from the measurement apparatus to a target object by a measurement apparatus;

a second acquisition unit configured to acquire input information for specifying a display range of the histogram to a range specified by a user; and an output unit configured to output a histogram, within the range indicated by the input information, representing a distribution of a plurality of the depth values based on the acquired depth information so that a frequency of a class corresponding to a depth value to be applied when depth value that is not valid is obtained is reduced.

17. A storage medium storing a program for causing a computer to execute an information processing method comprising:

acquiring depth information indicating a depth value from a measurement apparatus to a target object by using the measurement apparatus;

acquiring input information for specifying a display range of the histogram to a range specified by a user; and based on the acquired depth information, outputting a histogram, within the range indicated by the input information, representing a distribution of a plurality of the depth values where a frequency of a class including a predetermined depth value to be applied when depth value that is not valid is obtained is reduced.

18. An information processing method comprising:
acquiring depth information indicating a depth value from a measurement apparatus to a target object by using the measurement apparatus;

acquiring input information for specifying a display range of the histogram to a range specified by a user; and outputting a histogram, within the range indicated by the input information, representing a distribution of a plurality of the depth values based on the acquired depth information so that a frequency of a class including a predetermined depth value to be applied when depth value that is not valid is obtained is reduced.

19. An information processing method comprising:
acquiring depth information obtained from a result of measurement of a depth value from a measurement apparatus to a target object by the measurement apparatus;

acquiring input information for specifying a display range of the histogram to a range specified by a user; and outputting a histogram, within the range indicated by the input information, representing a distribution of a plurality of the depth values based on the acquired depth information so that a frequency of a class including a predetermined depth value to be applied when depth value that is not valid is obtained is reduced.

* * * * *